(12) United States Patent
Hasan

(10) Patent No.: US 12,160,426 B2
(45) Date of Patent: Dec. 3, 2024

(54) HUMAN SYSTEM OPERATOR IDENTITY ASSOCIATED AUDIT TRAIL OF CONTAINERIZED NETWORK APPLICATION WITH PREVENTION OF PRIVILEGE ESCALATION, ONLINE BLACK-BOX TESTING, AND RELATED SYSTEMS AND METHODS

(71) Applicant: Asad Hasan, Houston, TX (US)

(72) Inventor: Asad Hasan, Houston, TX (US)

( * ) Notice: Subject to any disclaimer, the term of this patent is extended or adjusted under 35 U.S.C. 154(b) by 0 days.

(21) Appl. No.: 18/135,150

(22) Filed: Apr. 15, 2023

(65) Prior Publication Data
US 2024/0187411 A1 Jun. 6, 2024

Related U.S. Application Data

(60) Provisional application No. 63/430,058, filed on Dec. 4, 2022.

(51) Int. Cl.
*H04L 9/40* (2022.01)
*G06F 8/61* (2018.01)

(52) U.S. Cl.
CPC .............. *H04L 63/10* (2013.01); *G06F 8/61* (2013.01)

(58) Field of Classification Search
None
See application file for complete search history.

(56) References Cited

U.S. PATENT DOCUMENTS

| | | | | |
|---|---|---|---|---|
| 5,311,593 | A | * 5/1994 | Carmi | ................ H04L 63/0428 370/452 |
| 5,734,820 | A | * 3/1998 | Howard | ................ H04L 63/104 726/21 |
| 5,999,978 | A | * 12/1999 | Angal | .................... H04L 41/28 707/999.009 |

(Continued)

FOREIGN PATENT DOCUMENTS

CN 114050911 A * 2/2022

OTHER PUBLICATIONS

Vollmer et al "Autonomic Intelligent Cyber Sensor to Support Industrial Control Network Awareness," Transactions on Industrial Informatics, Jun. 2013, pp. 1-12 (Year: 2013).*

(Continued)

*Primary Examiner* — Luu T Pham
*Assistant Examiner* — James J Wilcox
(74) *Attorney, Agent, or Firm* — Quisenberry Law PLLC

(57) ABSTRACT

Human system operator identity audit trail systems, methods and products for improving computer technology, including in the field of cloud security in the use of computer networks and legal compliance of computer systems and networks is disclosed. An audit trail of a human system operator's identity and time-stamp to network activities of a containerized application may be established. A human system operator may be prevented from escalating privilege and making unauthorized use of service accounts available to the containerized application in order to issue commands such as higher privilege queries and requests than the ones within the granted access of the human system operator. Granular black-box testing mechanisms may also be provided to assess functional changes across software versions using boundary-scan techniques.

12 Claims, 18 Drawing Sheets

(56) References Cited

U.S. PATENT DOCUMENTS

| | | | | |
|---|---|---|---|---|
| 6,038,563 A * | 3/2000 | Bapat | G06F 21/6227 | 707/999.009 |
| 6,064,656 A * | 5/2000 | Angal | H04L 63/105 | 370/254 |
| 6,070,243 A * | 5/2000 | See | H04L 63/08 | 709/229 |
| 6,085,191 A * | 7/2000 | Fisher | G06F 21/6227 | 707/999.009 |
| 6,212,511 B1 * | 4/2001 | Fisher | G06F 21/6227 | |
| 6,574,655 B1 * | 6/2003 | Libert | H04L 67/564 | 709/200 |
| 6,678,822 B1 * | 1/2004 | Morar | G06Q 10/0875 | 713/153 |
| 6,754,820 B1 * | 6/2004 | Scheidt | H04L 63/105 | 713/184 |
| 7,356,601 B1 * | 4/2008 | Clymer | H04L 63/0272 | 709/225 |
| 7,395,436 B1 * | 7/2008 | Nemovicher | H04L 63/0823 | 726/28 |
| 7,512,788 B2 * | 3/2009 | Choi | H04L 63/0421 | 713/182 |
| 7,596,614 B2 * | 9/2009 | Saunderson | H04L 61/5014 | 709/224 |
| 7,636,790 B1 * | 12/2009 | Parker | H04L 61/45 | 709/245 |
| 7,707,571 B1 * | 4/2010 | Harris | G06F 8/61 | 717/176 |
| 8,010,993 B1 * | 8/2011 | Bartholomay | H04L 63/20 | 726/1 |
| 8,041,022 B1 * | 10/2011 | Andreasen | H04L 12/14 | 709/224 |
| 8,467,355 B2 * | 6/2013 | Herscovici | H04W 12/088 | 370/360 |
| 8,527,618 B1 * | 9/2013 | Wiese | G06F 21/575 | 717/172 |
| 9,047,157 B1 * | 6/2015 | Boussarov | G06F 8/61 | |
| 9,176,720 B1 * | 11/2015 | Day-Richter | G06F 8/63 | |
| 9,411,973 B2 * | 8/2016 | Factor | G06F 9/46 | |
| 9,584,318 B1 * | 2/2017 | Yang | H04L 9/002 | |
| 9,602,508 B1 * | 3/2017 | Mahaffey | H04L 63/0869 | |
| 9,703,965 B1 * | 7/2017 | Robinson | H04L 63/123 | |
| 9,729,579 B1 * | 8/2017 | Marino | H04L 63/101 | |
| 9,756,050 B1 * | 9/2017 | Brandwine | H04L 47/70 | |
| 9,823,915 B1 * | 11/2017 | Maloney | G06F 9/4411 | |
| 9,930,613 B2 * | 3/2018 | Starsinic | H04W 12/088 | |
| 9,979,730 B2 * | 5/2018 | Wong | H04L 63/0281 | |
| 9,990,228 B1 * | 6/2018 | Jayanthi | G06F 9/455 | |
| 10,007,509 B1 * | 6/2018 | Qureshi | G06F 8/656 | |
| 10,057,269 B1 * | 8/2018 | Ellingson | H04L 63/101 | |
| 10,127,030 B1 * | 11/2018 | Mortman | H04L 9/3236 | |
| 10,255,419 B1 * | 4/2019 | Kragh | G06F 21/32 | |
| 10,255,445 B1 * | 4/2019 | Brinskelle | G06F 21/606 | |
| 10,270,759 B1 * | 4/2019 | Bordelon | G06F 9/4843 | |
| 10,291,607 B1 * | 5/2019 | Cifelli | H04L 67/55 | |
| 10,404,474 B1 * | 9/2019 | Caceres | G06F 9/455 | |
| 10,462,108 B1 * | 10/2019 | Hacker | H04L 63/10 | |
| 10,503,623 B2 | 12/2019 | Keller | | |
| 10,523,778 B1 * | 12/2019 | Lee | H04L 67/563 | |
| 10,560,478 B1 * | 2/2020 | Younes | H04L 69/22 | |
| 10,567,411 B2 | 2/2020 | Bernstein et al. | | |
| 10,581,847 B1 * | 3/2020 | Sun | H04L 63/083 | |
| 10,609,036 B1 * | 3/2020 | Allen | H04L 67/01 | |
| 10,713,655 B1 * | 7/2020 | McClintock | G06Q 20/3223 | |
| 10,732,891 B2 * | 8/2020 | Fetik | G06F 3/0604 | |
| 10,735,430 B1 * | 8/2020 | Stoler | H04L 9/14 | |
| 10,867,457 B1 * | 12/2020 | McCracken, Jr. | G06K 7/1413 | |
| 10,911,463 B1 * | 2/2021 | Rose | H04L 63/168 | |
| 10,929,512 B1 * | 2/2021 | Jakobsson | H04L 63/20 | |
| 10,938,737 B1 * | 3/2021 | Wegleitner | H04L 63/107 | |
| 10,963,529 B1 * | 3/2021 | Amitay | H04L 67/52 | |
| 10,992,678 B1 * | 4/2021 | Gilman | H04L 63/10 | |
| 10,997,559 B1 * | 5/2021 | Hoehnen | G06F 16/242 | |
| 11,080,096 B1 * | 8/2021 | Fakhouri | G06F 9/5072 | |
| 11,089,020 B1 * | 8/2021 | Sarukkai | H04L 67/1097 | |
| 11,108,763 B2 | 8/2021 | Sundararajan et al. | | |
| 11,140,455 B1 * | 10/2021 | Woodruff | H04N 21/2187 | |
| 11,146,569 B1 * | 10/2021 | Brooker | G06F 21/335 | |
| 11,159,326 B1 * | 10/2021 | Nelson | G06F 3/0484 | |
| 11,288,634 B1 * | 3/2022 | Hoehnen | G06F 9/547 | |
| 11,323,454 B1 * | 5/2022 | Li | H04L 63/0421 | |
| 11,336,652 B2 * | 5/2022 | Warrick | H04L 63/102 | |
| 11,372,654 B1 * | 6/2022 | Battle | G06F 16/13 | |
| 11,416,587 B1 * | 8/2022 | den Hartog | G06F 8/61 | |
| 11,442,765 B1 * | 9/2022 | Zhang | G06F 9/30145 | |
| 11,582,201 B1 * | 2/2023 | Moon | H04L 63/061 | |
| 11,616,787 B1 * | 3/2023 | Chhabra | H04L 63/104 | 726/1 |
| 11,627,136 B1 * | 4/2023 | Sharifi Mehr | G06F 21/604 | 726/28 |
| 11,736,290 B1 * | 8/2023 | Dods | H04L 9/0825 | |
| 11,736,489 B2 * | 8/2023 | Borkar | G06F 9/45558 | |
| 11,818,119 B1 * | 11/2023 | Dayan | H04L 63/083 | |
| 11,841,959 B1 * | 12/2023 | Ghetti | G06F 21/6218 | |
| 11,909,731 B1 * | 2/2024 | Dayan | H04L 63/0263 | |
| 2002/0162026 A1 * | 10/2002 | Neuman | H04L 63/0227 | 726/4 |
| 2003/0088771 A1 * | 5/2003 | Merchen | H04L 63/101 | 713/178 |
| 2003/0093681 A1 * | 5/2003 | Wettstein | H04L 63/0807 | 713/185 |
| 2003/0225699 A1 * | 12/2003 | Stefik | H04L 63/0807 | 375/E7.009 |
| 2004/0024764 A1 * | 2/2004 | Hsu | G06F 21/629 | 707/999.009 |
| 2004/0068668 A1 * | 4/2004 | Lor | H04L 69/329 | 709/224 |
| 2004/0177247 A1 * | 9/2004 | Peles | H04L 63/08 | 713/155 |
| 2005/0028006 A1 * | 2/2005 | Leser | H04L 63/20 | 726/26 |
| 2005/0108423 A1 * | 5/2005 | Centemeri | H04L 67/306 | 709/237 |
| 2005/0149450 A1 * | 7/2005 | Stefik | H04L 63/0807 | 375/E7.009 |
| 2005/0192979 A1 * | 9/2005 | Keller | H04L 41/082 | |
| 2005/0265327 A1 * | 12/2005 | Buch | H04L 63/10 | 726/4 |
| 2005/0267856 A1 * | 12/2005 | Woollen | G06F 8/61 | |
| 2006/0050870 A1 * | 3/2006 | Kimmel | H04L 9/3247 | 380/30 |
| 2006/0089126 A1 * | 4/2006 | Frank | H04L 63/10 | 455/411 |
| 2006/0090076 A1 * | 4/2006 | De Cnodder | G06Q 20/16 | 713/182 |
| 2006/0105744 A1 * | 5/2006 | Frank | H04L 63/0861 | 455/410 |
| 2006/0230461 A1 * | 10/2006 | Hauser | H04L 63/08 | 726/27 |
| 2006/0248599 A1 * | 11/2006 | Sack | H04L 63/102 | 707/999.009 |
| 2007/0220614 A1 * | 9/2007 | Ellis | G06F 21/645 | 726/27 |
| 2007/0230453 A1 * | 10/2007 | Giaretta | H04W 12/088 | 370/389 |
| 2007/0245030 A1 * | 10/2007 | Das | H04L 63/105 | 709/229 |
| 2007/0268878 A1 * | 11/2007 | Clements | H04L 63/029 | 370/352 |
| 2007/0271598 A1 * | 11/2007 | Chen | H04L 63/08 | 726/17 |
| 2007/0276925 A1 * | 11/2007 | La Joie | H04N 21/835 | 709/219 |
| 2007/0276951 A1 * | 11/2007 | Riggs | H04L 63/0428 | 709/219 |
| 2007/0293210 A1 * | 12/2007 | Strub | H04L 63/102 | 455/411 |
| 2008/0101376 A1 * | 5/2008 | Do | H04L 12/185 | 370/395.21 |
| 2008/0168523 A1 * | 7/2008 | Ansari | G05B 15/02 | 725/105 |

(56) References Cited

U.S. PATENT DOCUMENTS

| | | | |
|---|---|---|---|
| 2008/0178174 A1* | 7/2008 | Woolen | G06F 8/61 717/177 |
| 2008/0189324 A1* | 8/2008 | Keller | G06F 8/73 |
| 2008/0270986 A1* | 10/2008 | Simeonov | H04L 67/568 717/120 |
| 2009/0003600 A1* | 1/2009 | Chen | H04N 21/44055 380/217 |
| 2009/0210328 A1* | 8/2009 | Fomenko | H04L 63/10 705/30 |
| 2010/0106658 A1* | 4/2010 | Stefik | H04L 12/14 705/310 |
| 2010/0182983 A1* | 7/2010 | Herscovici | H04L 63/102 370/338 |
| 2010/0228975 A1* | 9/2010 | Lipka | G06F 21/44 713/168 |
| 2010/0229232 A1* | 9/2010 | Hellgren | H04M 15/00 726/9 |
| 2010/0242096 A1* | 9/2010 | Varadharajan | H04L 63/08 711/E12.001 |
| 2010/0242106 A1* | 9/2010 | Harris | H04L 63/08 709/224 |
| 2010/0325719 A1* | 12/2010 | Etchegoyen | H04L 69/40 726/15 |
| 2011/0022836 A1* | 1/2011 | Murphy | H04L 63/0823 713/176 |
| 2011/0023107 A1* | 1/2011 | Chen | H04L 63/0281 726/12 |
| 2011/0202989 A1* | 8/2011 | Otranen | H04W 12/068 726/8 |
| 2011/0246765 A1* | 10/2011 | Schibuk | H04L 63/102 713/158 |
| 2012/0054716 A1* | 3/2012 | Tailliez | G06F 8/61 717/107 |
| 2012/0084562 A1* | 4/2012 | Farina | G06F 21/575 713/168 |
| 2012/0131569 A1* | 5/2012 | Josepher | G06F 8/61 717/174 |
| 2012/0185913 A1* | 7/2012 | Martinez | H04L 63/20 726/1 |
| 2012/0198442 A1* | 8/2012 | Kashyap | G06F 9/44584 718/1 |
| 2012/0198512 A1* | 8/2012 | Zhou | H04L 47/122 726/1 |
| 2012/0203877 A1* | 8/2012 | Bartholomay | H04L 63/0227 709/221 |
| 2012/0214441 A1* | 8/2012 | Raleigh | H04W 4/12 455/406 |
| 2013/0047240 A1* | 2/2013 | Radhakrishnan | H04L 63/105 726/9 |
| 2013/0091273 A1* | 4/2013 | Ly | H04L 67/147 709/224 |
| 2013/0198065 A1* | 8/2013 | McPherson | H04L 12/1432 705/40 |
| 2013/0262396 A1* | 10/2013 | Kripalani | G06F 11/1464 707/674 |
| 2013/0276142 A1* | 10/2013 | Peddada | G06F 9/452 726/28 |
| 2013/0298183 A1* | 11/2013 | McGrath | H04L 63/10 718/1 |
| 2014/0006347 A1* | 1/2014 | Qureshi | H04W 12/06 707/783 |
| 2014/0032733 A1* | 1/2014 | Barton | G06F 21/6218 709/223 |
| 2014/0090009 A1* | 3/2014 | Li | G06F 21/6263 726/1 |
| 2014/0109209 A1* | 4/2014 | Haynes | H04L 63/08 726/7 |
| 2014/0122690 A1* | 5/2014 | Rowe | H04L 67/535 709/224 |
| 2014/0122715 A1* | 5/2014 | Rowe | H04L 67/02 709/225 |
| 2014/0123252 A1* | 5/2014 | Rowe | H04L 63/102 726/6 |
| 2014/0137188 A1* | 5/2014 | Bartholomay | H04L 63/0428 709/224 |
| 2014/0165189 A1* | 6/2014 | Foley | H04L 63/20 726/22 |
| 2014/0189777 A1* | 7/2014 | Viswanathan | H04L 63/105 726/1 |
| 2014/0189888 A1* | 7/2014 | Madhok | H04L 63/102 726/29 |
| 2014/0259074 A1* | 9/2014 | Ansari | H04N 21/4312 725/50 |
| 2014/0280952 A1* | 9/2014 | Shear | H04L 47/70 709/226 |
| 2014/0282096 A1* | 9/2014 | Rubinstein | H04L 65/403 715/753 |
| 2014/0282586 A1* | 9/2014 | Shear | G06F 16/245 718/104 |
| 2014/0282614 A1* | 9/2014 | Warren | G06F 9/465 719/316 |
| 2014/0282890 A1* | 9/2014 | Li | G06F 21/51 726/4 |
| 2014/0304836 A1* | 10/2014 | Velamoor | G06F 21/6209 726/28 |
| 2015/0058923 A1* | 2/2015 | Rajagopal | G06F 21/36 726/1 |
| 2015/0089577 A1* | 3/2015 | Beckman | H04L 67/56 726/1 |
| 2015/0128105 A1* | 5/2015 | Sethi | G06F 8/36 717/121 |
| 2015/0128204 A1* | 5/2015 | Lietz | H04L 63/107 726/1 |
| 2015/0128207 A1* | 5/2015 | Cabrera | H04L 63/062 726/1 |
| 2015/0205955 A1* | 7/2015 | Turgeman | H04L 63/10 726/7 |
| 2015/0212889 A1* | 7/2015 | Amarendran | G06F 11/1469 707/674 |
| 2015/0261768 A1* | 9/2015 | Ahn | G06F 16/113 707/665 |
| 2015/0278500 A1* | 10/2015 | Burch | H04L 63/10 726/6 |
| 2015/0302220 A1* | 10/2015 | Cismas | G06F 21/10 707/783 |
| 2015/0310209 A1* | 10/2015 | Zhang | G06F 8/61 717/174 |
| 2015/0363599 A1* | 12/2015 | Hoyer | H04L 63/08 726/27 |
| 2016/0006729 A1* | 1/2016 | Yang | H04L 63/0428 713/156 |
| 2016/0034305 A1* | 2/2016 | Shear | G06F 16/285 707/722 |
| 2016/0036667 A1* | 2/2016 | Kripalani | H04L 41/0883 709/224 |
| 2016/0042404 A1* | 2/2016 | Joshi | H04L 51/063 705/14.55 |
| 2016/0063277 A1* | 3/2016 | Vu | G06F 21/57 726/4 |
| 2016/0080341 A1* | 3/2016 | Jain | G06F 21/31 726/7 |
| 2016/0095153 A1* | 3/2016 | Chechani | H04W 12/08 370/338 |
| 2016/0112407 A1* | 4/2016 | Nara | H04L 63/102 726/5 |
| 2016/0134631 A1* | 5/2016 | Bercow | H04L 63/10 726/29 |
| 2016/0142482 A1* | 5/2016 | Mehta | G06F 8/61 709/203 |
| 2016/0171222 A1* | 6/2016 | Panchbudhe | G06F 21/62 713/193 |
| 2016/0219073 A1* | 7/2016 | Mathur | H04L 63/168 |
| 2016/0261685 A1* | 9/2016 | Chen | H04L 41/082 |
| 2016/0261690 A1* | 9/2016 | Ford | G06F 21/64 |
| 2016/0277410 A1* | 9/2016 | Kalb | H04L 63/107 |
| 2016/0277419 A1* | 9/2016 | Allen | H04L 63/102 |
| 2016/0294881 A1* | 10/2016 | Hua | H04L 63/20 |

(56) References Cited

U.S. PATENT DOCUMENTS

| | | | |
|---|---|---|---|
| 2016/0308839 A1* | 10/2016 | Chuang | G06F 8/00 |
| 2016/0342401 A1* | 11/2016 | Keis | H04L 67/34 |
| 2016/0366104 A1* | 12/2016 | Goldberg | G06F 9/45558 |
| 2016/0381075 A1* | 12/2016 | Goyal | G06F 21/64 |
| | | | 713/176 |
| 2017/0006020 A1* | 1/2017 | Falodiya | G06F 8/61 |
| 2017/0006066 A1* | 1/2017 | Eckel | H04L 63/20 |
| 2017/0026369 A1* | 1/2017 | Hao | H04L 63/0876 |
| 2017/0034173 A1* | 2/2017 | Miller | H04L 63/10 |
| 2017/0034179 A1* | 2/2017 | Carames | H04L 63/10 |
| 2017/0063859 A1* | 3/2017 | Shue | H04L 63/10 |
| 2017/0093923 A1* | 3/2017 | Duan | G06F 11/2028 |
| 2017/0096315 A1* | 4/2017 | Jackson | B65H 51/32 |
| 2017/0098092 A1* | 4/2017 | Nachenberg | G06F 21/53 |
| 2017/0126622 A1* | 5/2017 | Haak | H04L 63/0209 |
| 2017/0126625 A1* | 5/2017 | Haak | H04L 63/029 |
| 2017/0126653 A1* | 5/2017 | Lupien | G06F 16/986 |
| 2017/0147795 A1* | 5/2017 | Sardesai | G06F 21/41 |
| 2017/0149789 A1* | 5/2017 | Flynn, III | H04L 63/102 |
| 2017/0206071 A1* | 7/2017 | Kirkpatrick | G06F 9/44521 |
| 2017/0206123 A1* | 7/2017 | Kirkpatrick | H04L 67/146 |
| 2017/0206259 A1* | 7/2017 | Yang | G06F 21/62 |
| 2017/0228182 A1* | 8/2017 | Novak | H04L 63/0807 |
| 2017/0230350 A1* | 8/2017 | Enrique Salpico | H04L 63/101 |
| 2017/0308893 A1* | 10/2017 | Saraniecki | G06Q 20/405 |
| 2017/0324733 A1* | 11/2017 | Howry | H04W 12/50 |
| 2017/0339158 A1* | 11/2017 | Lewis | H04L 67/1025 |
| 2017/0339196 A1* | 11/2017 | Lewis | H04L 63/083 |
| 2017/0344949 A1* | 11/2017 | Nittala | H04L 63/104 |
| 2017/0366520 A1* | 12/2017 | Templin | H04L 9/0847 |
| 2017/0373936 A1* | 12/2017 | Hooda | H04L 41/0816 |
| 2018/0004499 A1* | 1/2018 | Ghosh | G06F 9/5083 |
| 2018/0007046 A1* | 1/2018 | Oberheide | H04W 12/06 |
| 2018/0007048 A1* | 1/2018 | Weaver | H04L 63/0457 |
| 2018/0007051 A1* | 1/2018 | Vij | G06F 21/6245 |
| 2018/0020353 A1* | 1/2018 | Bhandaru | H04L 9/088 |
| 2018/0034818 A1* | 2/2018 | Choi | G06F 3/04817 |
| 2018/0060091 A1* | 3/2018 | Ciano | G06F 9/452 |
| 2018/0062854 A1* | 3/2018 | Kancharla | H04L 63/101 |
| 2018/0063117 A1* | 3/2018 | Tseng | H04L 63/10 |
| 2018/0081514 A1* | 3/2018 | Bostick | H04L 51/224 |
| 2018/0083971 A1* | 3/2018 | Brown | H04L 63/126 |
| 2018/0084427 A1* | 3/2018 | Huo | H04W 12/041 |
| 2018/0091449 A1* | 3/2018 | Tellez | G06F 9/45533 |
| 2018/0097698 A1* | 4/2018 | Haubold | G06F 8/61 |
| 2018/0123795 A1* | 5/2018 | Norman | G06F 21/629 |
| 2018/0167218 A1* | 6/2018 | Walrant | H04L 63/0876 |
| 2018/0198824 A1* | 7/2018 | Pulapaka | H04L 41/5025 |
| 2018/0204018 A1* | 7/2018 | Panchbudhe | G06F 21/10 |
| 2018/0205612 A1* | 7/2018 | Rao | G06F 8/60 |
| 2018/0213038 A1* | 7/2018 | Chung | H04L 12/1471 |
| 2018/0218145 A1* | 8/2018 | Hussain | H04L 63/10 |
| 2018/0219877 A1* | 8/2018 | Hsu | G06F 21/62 |
| 2018/0225104 A1* | 8/2018 | Ciano | G06F 9/45533 |
| 2018/0247075 A1* | 8/2018 | Aistrope | G06F 16/51 |
| 2018/0248770 A1* | 8/2018 | Regmi | G06F 9/45533 |
| 2018/0253539 A1* | 9/2018 | Minter | G06F 21/64 |
| 2018/0268386 A1* | 9/2018 | Wack | G06Q 20/02 |
| 2018/0270290 A1* | 9/2018 | Sinha | H04L 67/2871 |
| 2018/0278613 A1* | 9/2018 | Ganda | G06F 21/6209 |
| 2018/0285139 A1* | 10/2018 | Shapira | G06F 9/45558 |
| 2018/0285165 A1* | 10/2018 | Helsley | G06F 9/5077 |
| 2018/0287999 A1* | 10/2018 | Kaushik | H04L 63/0209 |
| 2018/0324155 A1* | 11/2018 | Leavy | G06F 16/22 |
| 2018/0336351 A1* | 11/2018 | Jeffries | G06F 21/53 |
| 2018/0359266 A1* | 12/2018 | Andow | G06F 21/62 |
| 2019/0042320 A1* | 2/2019 | Prince | G06F 9/5077 |
| 2019/0065278 A1* | 2/2019 | Jeuk | G06F 9/5077 |
| 2019/0068372 A1* | 2/2019 | Bhatnagar | H04L 51/18 |
| 2019/0068567 A1* | 2/2019 | Bhatnagar | H04L 9/321 |
| 2019/0081955 A1* | 3/2019 | Chugtu | H04L 63/0236 |
| 2019/0087220 A1* | 3/2019 | Turner | G06F 16/27 |
| 2019/0087244 A1* | 3/2019 | Turner | G06F 9/5077 |
| 2019/0089737 A1* | 3/2019 | Shayevitz | H04L 63/1425 |
| 2019/0098505 A1* | 3/2019 | Mars | H04L 63/102 |
| 2019/0103960 A1* | 4/2019 | Viswanathan | H04L 12/66 |
| 2019/0116170 A1* | 4/2019 | Reddipalli | G06F 3/0643 |
| 2019/0116624 A1* | 4/2019 | Tandon | H04W 36/00226 |
| 2019/0132326 A1* | 5/2019 | Spradlin | H04L 63/20 |
| 2019/0149552 A1* | 5/2019 | Ellingson | H04W 12/02 |
| | | | 726/7 |
| 2019/0190869 A1* | 6/2019 | Peiris | G06Q 50/01 |
| 2019/0190870 A1* | 6/2019 | Peiris | G06F 3/04842 |
| 2019/0190871 A1* | 6/2019 | Peiris | G06Q 50/01 |
| 2019/0190872 A1* | 6/2019 | Peiris | H04L 51/52 |
| 2019/0190931 A1* | 6/2019 | Levin | H04L 63/20 |
| 2019/0196804 A1* | 6/2019 | Li | G06F 9/45558 |
| 2019/0199522 A1* | 6/2019 | Liao | H04L 63/08 |
| 2019/0199687 A1* | 6/2019 | Lan | G06F 21/53 |
| 2019/0222610 A1* | 7/2019 | Kirner | H04L 41/22 |
| 2019/0230130 A1* | 7/2019 | Beckman | H04L 67/565 |
| 2019/0235897 A1* | 8/2019 | Goel | G06F 9/545 |
| 2019/0251278 A1* | 8/2019 | Kalinichenko | H04L 9/0825 |
| 2019/0258782 A1* | 8/2019 | Lerner | G07C 9/257 |
| 2019/0260716 A1* | 8/2019 | Lerner | H04L 63/0876 |
| 2019/0260753 A1* | 8/2019 | Lewis | H04L 63/102 |
| 2019/0266604 A1* | 8/2019 | Desai | G06Q 30/06 |
| 2019/0273744 A1* | 9/2019 | Goel | G06F 21/629 |
| 2019/0297073 A1* | 9/2019 | Rossi | H04L 63/0823 |
| 2019/0317747 A1* | 10/2019 | Kulkarni | G06F 8/61 |
| 2019/0349402 A1* | 11/2019 | Shukla | H04L 63/0263 |
| 2019/0372850 A1* | 12/2019 | Fandli | H04L 63/12 |
| 2019/0377871 A1* | 12/2019 | Park | G06F 21/552 |
| 2019/0386973 A1* | 12/2019 | Patwardhan | H04L 63/08 |
| 2020/0007311 A1* | 1/2020 | Oberhofer | H04L 63/102 |
| 2020/0013062 A1* | 1/2020 | Pratt | H04L 63/102 |
| 2020/0021591 A1* | 1/2020 | Hecht | H04L 63/10 |
| 2020/0021615 A1* | 1/2020 | Wainner | G06F 8/71 |
| 2020/0036707 A1* | 1/2020 | Callahan | H04L 67/53 |
| 2020/0036708 A1* | 1/2020 | Mars | H04L 63/107 |
| 2020/0036709 A1* | 1/2020 | Mars | H04L 63/0853 |
| 2020/0042851 A1* | 2/2020 | Sarfati Halabi | G06K 19/0723 |
| 2020/0053098 A1* | 2/2020 | Delaney | H04L 63/108 |
| 2020/0067708 A1* | 2/2020 | Subba | H04L 9/3226 |
| 2020/0067927 A1* | 2/2020 | Ellingson | H04L 63/0428 |
| 2020/0076811 A1* | 3/2020 | Rudden | G06F 21/53 |
| 2020/0081706 A1* | 3/2020 | Tal | H04L 63/166 |
| 2020/0092332 A1* | 3/2020 | Bhattathiri | H04L 63/20 |
| 2020/0112589 A1* | 4/2020 | Bequet | G06F 16/164 |
| 2020/0112589 A1* | 4/2020 | Chauhan | H04W 12/02 |
| 2020/0117478 A1* | 4/2020 | Li | G06F 9/455 |
| 2020/0117489 A1* | 4/2020 | Borkar | G06F 8/61 |
| 2020/0145515 A1* | 5/2020 | Fleck | H04L 63/1441 |
| 2020/0154271 A1* | 5/2020 | Rane | G06F 21/335 |
| 2020/0154272 A1* | 5/2020 | Uy | H04W 12/08 |
| 2020/0162359 A1* | 5/2020 | Borkar | H04L 43/50 |
| 2020/0192661 A1* | 6/2020 | Doyle | G06F 8/73 |
| 2020/0201827 A1* | 6/2020 | Chacko | G06F 9/4451 |
| 2020/0202028 A1* | 6/2020 | Tadayon | G06F 21/6245 |
| 2020/0202029 A1* | 6/2020 | Tadayon | H04W 12/02 |
| 2020/0202359 A1* | 6/2020 | Tadayon | H04L 63/108 |
| 2020/0210217 A1* | 7/2020 | Jeon | H04L 67/61 |
| 2020/0257810 A1* | 8/2020 | Vrabec | H04L 63/20 |
| 2020/0267126 A1* | 8/2020 | Beye | H04L 63/107 |
| 2020/0272440 A1* | 8/2020 | Burgazzoli | G06F 8/70 |
| 2020/0287904 A1* | 9/2020 | Asher | G06N 20/00 |
| 2020/0310775 A1* | 10/2020 | Nyamars | G06Q 20/382 |
| 2020/0314167 A1* | 10/2020 | Achyuth | H04L 63/107 |
| 2020/0319868 A1* | 10/2020 | Viana | G06F 9/5077 |
| 2020/0322145 A1* | 10/2020 | Sheth | H04L 9/3247 |
| 2020/0351271 A1* | 11/2020 | Murdoch | H04L 63/102 |
| 2020/0358621 A1* | 11/2020 | Ngo | H04L 67/561 |
| 2020/0358804 A1* | 11/2020 | Crabtree | H04L 63/1425 |
| 2020/0366685 A1* | 11/2020 | Ullrich | H04L 63/08 |
| 2020/0380147 A1* | 12/2020 | Kurian | H04L 63/08 |
| 2020/0382505 A1* | 12/2020 | Kurian | H04L 63/10 |
| 2020/0382506 A1* | 12/2020 | Kurian | H04L 63/08 |
| 2020/0382518 A1* | 12/2020 | Venture | H04W 12/08 |
| 2020/0389317 A1* | 12/2020 | Dunjic | H04L 9/30 |
| 2020/0389497 A1* | 12/2020 | Cam-Winget | H04L 41/0894 |
| 2020/0389531 A1* | 12/2020 | Lee | H04L 67/51 |
| 2020/0401492 A1* | 12/2020 | Vijayvargiya | G06F 9/45558 |
| 2021/0026614 A1* | 1/2021 | Manoharan | G06F 8/60 |
| 2021/0048995 A1* | 2/2021 | Myers | G06F 11/1451 |

(56) References Cited

U.S. PATENT DOCUMENTS

| | | | |
|---|---|---|---|
| 2021/0051182 A1* | 2/2021 | Milton | H04L 63/0823 |
| 2021/0075768 A1* | 3/2021 | Polimera | H04L 63/10 |
| 2021/0081947 A1* | 3/2021 | Hockey | G06Q 20/4014 |
| 2021/0084048 A1* | 3/2021 | Kannan | H04L 63/104 |
| 2021/0091995 A1* | 3/2021 | Trim | H04L 9/0643 |
| 2021/0096882 A1* | 4/2021 | Miller | G06F 16/188 |
| 2021/0097037 A1* | 4/2021 | Babol | G06F 11/1004 |
| 2021/0097189 A1* | 4/2021 | Miller | G06F 21/53 |
| 2021/0097190 A1* | 4/2021 | Scrivano | H04L 63/104 |
| 2021/0111881 A1* | 4/2021 | Migault | H04L 9/0841 |
| 2021/0119983 A1* | 4/2021 | Edwards | H04L 63/06 |
| 2021/0120413 A1* | 4/2021 | Puppala | H04W 12/069 |
| 2021/0133298 A1* | 5/2021 | Andrews | G06F 21/53 |
| 2021/0135943 A1* | 5/2021 | Andrews | H04L 63/20 |
| 2021/0136082 A1* | 5/2021 | Andrews | H04L 63/105 |
| 2021/0136115 A1* | 5/2021 | Andrews | H04L 63/1433 |
| 2021/0141645 A1* | 5/2021 | Kramer | G06F 8/61 |
| 2021/0146950 A1* | 5/2021 | Lee | H04L 65/40 |
| 2021/0150829 A1* | 5/2021 | Lee | G06F 9/455 |
| 2021/0185035 A1* | 6/2021 | Fernandez Yu | G06F 16/436 |
| 2021/0224076 A1* | 7/2021 | Dockter | G06F 8/61 |
| 2021/0227024 A1* | 7/2021 | Glass | H04L 41/0816 |
| 2021/0232418 A1* | 7/2021 | Corrie | G06F 8/61 |
| 2021/0232700 A1* | 7/2021 | Sahib | G06F 21/335 |
| 2021/0234669 A1* | 7/2021 | Singh | H04L 63/0435 |
| 2021/0241149 A1* | 8/2021 | Carlson | G06N 5/043 |
| 2021/0263711 A1* | 8/2021 | Douglas | G06F 8/36 |
| 2021/0266303 A1* | 8/2021 | Pollutro | H04L 63/0435 |
| 2021/0281548 A1* | 9/2021 | Ackerly | H04L 63/10 |
| 2021/0286861 A1* | 9/2021 | Churchill | G06F 21/10 |
| 2021/0294624 A1* | 9/2021 | Gray | G06F 8/24 |
| 2021/0306347 A1* | 9/2021 | Amoros | G06F 16/183 |
| 2021/0314297 A1* | 10/2021 | Peterson | H04L 63/0263 |
| 2021/0314310 A1* | 10/2021 | Cao | G06F 9/44505 |
| 2021/0319442 A1* | 10/2021 | Chapiewski | G06Q 20/3223 |
| 2021/0336947 A1* | 10/2021 | Rubin | H04L 63/14 |
| 2021/0377309 A1* | 12/2021 | Jogand-Coulomb | G06K 7/10366 |
| 2021/0383003 A1* | 12/2021 | Katsoulakos | G06F 21/10 |
| 2021/0383325 A1* | 12/2021 | Loupos | H04W 4/023 |
| 2021/0392151 A1* | 12/2021 | Lakhani | H04L 63/20 |
| 2021/0409345 A1* | 12/2021 | Elmenshawy | G06F 21/45 |
| 2022/0021523 A1* | 1/2022 | Klein | H04L 67/10 |
| 2022/0027216 A1* | 1/2022 | Driscoll | G06F 9/542 |
| 2022/0053001 A1* | 2/2022 | Shipkovenski | H04L 63/0823 |
| 2022/0053047 A1* | 2/2022 | Lenrow | G06F 9/547 |
| 2022/0060900 A1* | 2/2022 | Yoon | G06F 8/61 |
| 2022/0094531 A1* | 3/2022 | Kozlov | H04L 9/0894 |
| 2022/0100776 A1* | 3/2022 | Vokaliga | G06F 16/27 |
| 2022/0100892 A1* | 3/2022 | Safi | G06Q 30/01 |
| 2022/0103573 A1* | 3/2022 | Corella | H04L 63/1425 |
| 2022/0141192 A1* | 5/2022 | Silveira | H04L 63/0823 726/15 |
| 2022/0141662 A1* | 5/2022 | Liao | H04W 12/37 726/1 |
| 2022/0159054 A1* | 5/2022 | Rose | G06F 3/0484 |
| 2022/0171863 A1* | 6/2022 | Green | G06F 21/31 |
| 2022/0174066 A1* | 6/2022 | Rose | H04L 63/08 |
| 2022/0188815 A1* | 6/2022 | Higgins | G06Q 20/3827 |
| 2022/0191247 A1* | 6/2022 | Dhoble | H04L 9/3226 |
| 2022/0201073 A1* | 6/2022 | Mallikarjuna Durga Lokanath | G06F 9/45558 |
| 2022/0207134 A1* | 6/2022 | Protasov | G06F 8/61 |
| 2022/0210197 A1* | 6/2022 | Vaner | H04L 63/20 |
| 2022/0217139 A1* | 7/2022 | Pieczul | H04L 63/20 |
| 2022/0244976 A1* | 8/2022 | Pal | H04L 67/141 |
| 2022/0255966 A1* | 8/2022 | Sienicki | H04L 63/0435 |
| 2022/0263835 A1* | 8/2022 | Pieczul | H04L 63/08 |
| 2022/0263886 A1* | 8/2022 | Rose | G06Q 20/409 |
| 2022/0272082 A1* | 8/2022 | Gupta | H04L 63/14 |
| 2022/0283794 A1* | 9/2022 | Wolfson | H04L 9/0822 |
| 2022/0294628 A1* | 9/2022 | Mahmood | G16H 20/00 |
| 2022/0308849 A1* | 9/2022 | Kumar | G06F 11/1469 |
| 2022/0329628 A1* | 10/2022 | Zayats | G06F 3/0622 |
| 2022/0350931 A1* | 11/2022 | Shua | H04L 9/0894 |
| 2022/0360609 A1* | 11/2022 | Anton | G06F 16/2219 |
| 2022/0368695 A1* | 11/2022 | Upton | G06F 9/547 |
| 2022/0374284 A1* | 11/2022 | Kirmse | G06F 9/5072 |
| 2022/0398077 A1* | 12/2022 | Stopford | G06F 8/61 |
| 2022/0405152 A1* | 12/2022 | Edamadaka | H04L 63/102 |
| 2022/0407856 A1* | 12/2022 | Jawed | G06F 21/45 |
| 2022/0407894 A1* | 12/2022 | Bellmore | H04L 63/0236 |
| 2022/0417219 A1* | 12/2022 | Sheriff | H04L 67/56 |
| 2023/0006988 A1* | 1/2023 | Menth | H04L 63/20 |
| 2023/0035189 A1* | 2/2023 | Mullin | H04L 63/105 |
| 2023/0050222 A1* | 2/2023 | Wang | H04L 63/123 |
| 2023/0057851 A1* | 2/2023 | Ansari | B05D 3/002 |
| 2023/0067537 A1* | 3/2023 | Casey | G16H 15/00 |
| 2023/0108661 A1* | 4/2023 | Adogla | G06F 9/485 713/2 |
| 2023/0120522 A1* | 4/2023 | Bhandari | H04L 63/20 726/4 |
| 2023/0127037 A1* | 4/2023 | Waite | G06F 9/45558 717/175 |
| 2023/0141428 A1* | 5/2023 | Jacobson | H04L 9/3247 713/168 |
| 2023/0153150 A1* | 5/2023 | Kozlowski | H04L 63/20 718/108 |
| 2023/0176839 A1* | 6/2023 | Stefanov | G06F 8/65 717/140 |
| 2023/0196479 A1* | 6/2023 | Khan | H04L 63/10 705/319 |
| 2023/0209341 A1* | 6/2023 | Shawish | H04L 63/101 726/7 |
| 2023/0259347 A1* | 8/2023 | Von Der Heiden | G06F 9/45558 717/174 |
| 2023/0261871 A1* | 8/2023 | McCombes | H04L 9/3242 713/159 |
| 2023/0275766 A1* | 8/2023 | Wagner | H04L 9/3213 713/176 |
| 2023/0412602 A1* | 12/2023 | Gyarmathy | H04L 63/101 |
| 2024/0064147 A1* | 2/2024 | Jain | H04L 63/20 |
| 2024/0129320 A1* | 4/2024 | Bernsen | H04L 63/123 |

OTHER PUBLICATIONS

Lee et al "Source Accountability with Domain-Brokered Privacy," Oct. 3, 2016, pp. 1-17 (Year: 2016).*

Deng et al Google Translation of CN114050911A, pp. 1-13 (Year: 2022).*

Zhang et al "A User-Centric WS-Mediator Framework for on-the-fly Web Service Composition," 19th Telecommunications Forum TELFOR 2011, pp. 1499-1502 (Year: 2011).*

Gopularam et al "Improved Security of Audit Trail Logs in Multi-Tenant Cloud using ABE Schemes," International Journal of Advanced Computer Science and Applications, vol. 5, No. 11, 2014, pp. 115-120 (Year: 2014).*

Tao et al "Containerized Resource Provisioning Driven by User Preference," 2017 IEEE International Conference on Computational Science and Engineering (CSE) and IEEE International Conference on Embedde4d and Ubiquitous Computing (EUC), IEEE Computer Society, pp. 487-490 (Year: 2017).*

Rovnyagin et al "Using the ML-based Architecture for Adaptive Containerized System Creation," IEEE, pp. 358-360 (Year: 2018).*

Merino et al "Managed Containers: A Framework for Resilient Containerized Mission Critical Systems," 2018 IEEE 11th International Conference on Cloud Computing, IEEE Computer Society, pp. 946-949 (Year: 2018).*

Thakur et al "User Identity and Access Management Trends in IT Infrastructure—An Overview," 2015 International Conference on Pervasive Computing (ICPC), IEEE, pp. 1-4 (Year: 2015).*

Google. (n.d.). Best practices for working with service accounts | IAM documentation | google cloud. Google, Sep. 25, 2022.

"Operator entries and actions", 21 CFR § 11.10 Controls for closed systems (e) https://www.ecfr.gov/current/title-21/chapter-I/subchapter-A/part-11/subpart-B/section-11.10, Mar. 20, 1997.

Docker Inc. (Oct. 19, 2022). What is a container? Docker. https://www.docker.com/resources/what-container/.

(56) References Cited

OTHER PUBLICATIONS

"Userland, n." The Jargon File. Eric S. Raymond. http://www.catb.org/jargon/html/U/userland.html, Dec. 29, 2003.

"Kernel". Linfo. Bellevue Linux Users Group. http://www.linfo.org/kernel.html, May 25, 2004.

"Containers vs virtual machines"—your cheat sheet to know . . . -akamai. (n.d.). https://www.akamai.com/blog/security/containers-vs-virtual-mac, May 15, 2019.

Rad, Bashari et al. "An Introduction to Docker and Analysis of its Performance." (2017). http://paper.ijcsns.org/07_book/201703/20170327.pdf.

Docker Inc. (Nov. 25, 2022). How services work. Docker Documentation. https://docs.docker.com/engine/swarm/how-swarm-mode-works/servi.

KPMG. (May 10, 2021). The Hidden Security Risks from service accounts. KPMG LLP. https://advisory.kpmg.us/articles/2021/hidden-security-r.

Wan traversal via UDP Hole-punching. (n.d.). https://community.rti.com/static/documentation/connext-dds/5.3.0/doc/manuals/connext_dds/html_file/RTI_ConnextDDS_CorelLibraries, Jun. 29, 2017.

TCP handshake—MDN web docs glossary; definitions of web-related terms: MDN. MDN Web Docs Glossary; Definitions of Web-related terms | MDN. (n.d.). https://developer.mozill, Sep. 21, 2020.

Fette, I., Melnikov, A. (2011, December 1). The Websocket Protocol. The WebSocket Protocol. https://www.rfc-editor.org/rfc/rfc6455.

13. Fette, I., & Melnikov, A. (Dec. 1, 2011). RFC 7540—Hypertext Transfer Protocol version 2 (HTTP/2). Hypertext Transfer Protocol Version 2 (HTTP/2).https://datatrack.

14. Campbell, B., Mortimore, C., & Jones, M. (May 1, 2015). Security assertion markup language (SAML) 2.0 profile for OAUTH 2.0 Client Authentication and Authorization Grant.

Hardt, D. (Oct. 1, 2012). The OAuth 2.0 Authorization Framework. IETF. https://www.ietf.org/rfc/rfc6749.txt.

Harrison, R. (Jun. 1, 2006). RFC 4513—lightweight directory access protocol (LDAP): Authentication methods and security mechanisms. Document search and retrieval page.

Ricketts, J. (May 8, 2020). Five steps for integrating all your apps with Azure ad—Microsoft Entra. Microsoft Entra | Microsoft Learn. https://learn.microsoft.com/en-us/azu.

Jones, M., Bradley, J., & Sakimura, N. (May 1, 2015). JSON web token (JWT). RFC Editor. https://www.rfc-editor.org/rfc/rfc7519.html.

Broyer, T. (Jan. 5, 2005). Cookie-based HTTP Authentication Draft-Broyer-HTTP-cookie-AUTH-00. Cookie-based HTTP Authentication.https://www.ietf.org/archive/id/draft-broye.

Jones, M., & Hardt, D. (Oct. 1, 2012). The OAuth 2.0 authorization framework: Bearer token usage. RFC Editor. https://www.rfc-editor.org/rfc/rfc6750.html.

Shixiong, Q., Sameer, K. G., & Ramakrishnan, K. K. (Oct. 11, 2020). Understanding Container Network Interface Plugins. NSF Public Access Repository. https://par.nsf.gov/s.

Dworkin, M. J., Barker, E. B., Nechvatal, J. R., Foti, J., Bassham, L. E., Roback, E., Jr., J. F. D. (Mar. 1, 2021). Advanced encryption standard (AES). NIST.https://.

Grassi, P. A., Garcia, M. E., & Fenton, J. L. (Jun. 1, 2017). NIST Special Publication 800-63. NIST Pages. https://pages.nist.gov/800-63-3/sp800-63-3.html.

Christoffersen, J. (Sep. 3, 2015). Switch Bounce and how to deal with it—technical articles. All About Circuits.https://www.allaboutcircuits.com/technical-articles/sw.

Identity-Aware Proxy overview, https://cloud.google.com/iap/docs/concepts-overview, May 4, 2019.

* cited by examiner

HUMAN SYSTEM OPERATOR IDENTITY ASSOCIATED AUDIT TRAIL OF CONTAINERIZED NETWORK APPLICATION WITH PREVENTION OF PRIVILEGE ESCALATION, ONLINE BLACK-BOX TESTING, AND RELATED SYSTEMS AND METHODS

RELATED APPLICATIONS

This application claims the benefit of U.S. Provisional Application No. 63/430,058, filed Dec. 4, 2022, the contents of which provisional patent application are fully incorporated herein by reference.

BACKGROUND OF THE INVENTIONS

1. Field of the Inventions

The present inventions generally relate to improved computer technology, and more particularly to the field of cloud security and legal compliance of computer systems.

2. Description of the Related Art

The advent of cloud technology has led to distributed computer services providing data services to each other, while making use of service accounts which obfuscate the identity of the humans that issue commands to such distributed computer services. The systems and methods of the present inventions overcome security and legal compliance issues and deficiencies with current computer technology and use of service accounts, including by allowing distributed computer services to share identity, access, context information and auditable events while storing relevant inputs and outputs to allow testing and identity associating containerized network applications. The present inventions allow for more secure and reliable computer network systems, which can self-test and are aware of the identity and access constraints of the human system operators that issued the actionable commands to the network of computer services involved.

As discussed in more detail below, the present inventions and the manner in which they solve the above-mentioned problems, generally relate to the field of cloud security and legal compliance of computer systems, and more particularly to associating an audit trail of a human system operator's identity and time-stamp ("operator entries and actions", 21 CFR § 11.10 Controls for closed systems (e)) to the network activities of a containerized application and preventing a human operator of the system from escalating privilege and making unauthorized use of service accounts available to the containerized application in order to issue commands such as higher privilege queries and requests than the ones within the granted access of the human system operator. The present inventions may further allow for granular black-box testing mechanisms to assess functional changes across software versions using techniques similar to boundary-scan methods for testing of ICs applied to containerized software applications. See Google. (n.d.). Best practices for working with service accounts IAM documentation | google cloud. Google. Retrieved Nov. 26, 2022, and Testability primer (rev. C)-Texas Instruments. (2011 Aug. 6). Retrieved Jan. 11, 2023, the contents of which are fully incorporated herein by reference.

SUMMARY OF THE INVENTIONS

Methods and systems are disclosed for associating the network activity of a containerized software application with the identity of the human system operator issuing commands over the network that lead to such activities. A method may include recording of a human system operator's actions and their side-effect network transactions for legal compliance purposes and prevention of privilege escalation by detecting by-product network commands issued to supplementary network services not authorized to the human system operator by reconciliation via access control lists. The recorded network transactions may be encrypted and stored against the human system operator's identity and their operations' time-stamps. These stored transactions can be used to establish a true audit trail of the human system operator's actions using a containerized network application, which would otherwise be obfuscated as actions performed by machine identities better known as service accounts. Such stored transactions with human system operator identity contextualization of inputs and outputs preserved can also be used to perform user story black-box testing of developmental changes to the containerized network application to prevent unexpected behavioral changes. See Cohn, M. (n.d.). User stories and user story examples by Mike Cohn. Mountain Goat Software. Retrieved Dec. 1, 2022, and British Computer Society, SIGIST. (2001 Apr. 27). Component Testing Standard. Standard for Software Component Testing. Retrieved Dec. 2, 2022, the contents of which are fully incorporated herein by reference.

In one aspect, the present inventions may include a human system operator identity audit trail system for improving security in the use of computer networks, the system comprising: a server including program instructions configured to: receive an incoming command from a human system operator client, wherein the incoming command requires communication of network traffic between the server and at least one network service in order for the command to be satisfied; determine the identity of a human system operator corresponding to the command by authenticating the command; associate the identity of the identified human system operator with the incoming command; create an application container including a developer application and an operating system for executing the developer application; assign the application container to the incoming command; determine if the identified human system operator is authorized to execute the incoming network command and subsequent network service commands; if the identified human system operator is not authorized to execute the incoming network command and subsequent network service commands, then send a response back to the human system operator client denying the incoming command; if the identified human system operator is authorized to implement the incoming command and subsequent network service commands, then: send network traffic to the network service corresponding to the incoming command; receive a response from the network service corresponding to the incoming command; send a response back to the human system operator client to complete processing of the incoming command; store network traffic between the human system operator client and the server that corresponds to the incoming command and the identity of the human system operator; and store network traffic between the server and the network service that corresponds to the incoming command and the identity of the human system operator. Another feature of this aspect of the present inventions may be that, to assign the application container to the incoming command, the server is configured to: create a human system operator identity associated container task with a unique process ID on a host operating system on the server; create an ephemeral virtual network interface controller; attach the ephemeral virtual network interface controller to a virtual network bridge interface controller that is connected to a network interface controller in the server and associated with the host operating system; attach the ephemeral virtual network interface controller to the unique host operating system process ID of the human system operator identity associated container task; and send incoming network traffic corresponding to the incoming command to the human system operator identity associated container task. Another feature of this aspect of the present inventions may be that the server is configured to use a unique IP address corresponding to the unique process ID to attach the ephemeral virtual network interface controller to the virtual network bridge interface controller. Another feature of this aspect of the present inventions may be that the server is configured to: capture ethernet frames to and from the ephemeral virtual network interface controller attached to the unique process ID of the human system operator identity associated container task after the ephemeral virtual network interface controller is attached to the unique host operating system process ID of the human system operator identity associated container task and before incoming network traffic corresponding to the incoming command is sent to the human system operator identity associated container task. Another feature of this aspect of the present inventions may be that the server is configured to detect attempted network transmission attempts to or from the human system operator identity associated container task, wherein the attempted network transmission is detected through the ephemeral virtual network interface controller. Another feature of this aspect of the present inventions may be that the server is configured to detect attempted network transmission attempts to or from the human system operator identity associated container task, wherein the attempted network transmission is detected through configured proxy endpoints. Another feature of this aspect of the present inventions may be that the developer application determines the destination network service in reaction to execution of the incoming command from the human system operator client. Another feature of this aspect of the present inventions may be that the developer application includes an interception mode in which original destination network service network addresses are used to communication with the at least one network service, and a proxy mode in which proxy endpoints are used to communicate with the at least one network service. Another feature of this aspect of the present inventions may be that the developer application uses a service account to authenticate with the at least one network service, and the authenticated human system operator identity is associated with each use of the service account with the at least one network service.

In another aspect, the present inventions may include a non-transitory computer readable medium having program instructions embodied thereon, the program instructions executable by a processor to cause the processor to perform a method comprising: receiving an incoming command from a human system operator client, wherein the incoming command requires communication of network traffic between the server and at least one network service in order for the command to be satisfied; determining the identity of a human system operator corresponding to the command by authenticating the command; associating the identity of the identified human system operator with the incoming command; creating an application container including a developer application and an operating system for executing the developer application; assigning the application container to the incoming command; determining if the identified human system operator is authorized to execute the incoming network command and subsequent network service commands; if the identified human system operator is not authorized to execute the incoming network command and subsequent network service commands, then sending a response back to the human system operator client denying the incoming command; if the identified human system operator is authorized to implement the incoming command and subsequent network service commands, then: sending network traffic to the network service corresponding to the incoming command; receiving a response from the network service corresponding to the incoming command; sending a response back to the human system operator client to complete processing of the incoming command; storing network traffic between the human system operator client and the server that corresponds to the incoming command and the identity of the human system operator; and storing network traffic between the server and the network service that corresponds to the incoming command and the identity of the human system operator. Another feature of this aspect of the present inventions may be that assigning the application container to the incoming command includes: creating a human system operator identity associated container task with a unique process ID on a host operating system on the server; creating an ephemeral virtual network interface controller; attaching the ephemeral virtual network interface controller to a virtual network bridge interface controller that is connected to a network interface controller in the server and associated with the host operating system; attaching the ephemeral virtual network interface controller to the unique host operating system process ID of the human system operator identity associated container task; and sending incoming network traffic corresponding to the incoming command to the human system operator identity associated container task. Another feature of this aspect of the present inventions may be that the method further comprises using a unique IP address corresponding to the unique process ID to attach the ephemeral virtual network interface controller to the virtual network bridge interface controller. Another feature of this aspect of the present inventions may be that the method further comprises: capturing ethernet frames to and from the ephemeral virtual network interface controller attached to the unique process ID of the human system operator identity associated container task after the ephemeral virtual network interface controller is attached to the unique host operating system process ID of the human system operator identity associated container task and before incoming network traffic corresponding to the incoming command is sent to the human system operator identity associated container task. Another feature of this aspect of the present inventions may be that the method further comprising detecting attempted network transmission attempts to or from the human system operator identity associated container task through the ephemeral virtual network interface controller. Another feature of this aspect of the present inventions may be that the method further comprises detecting attempted network transmission attempts to or from the human system operator identity associated container task through configured proxy endpoints. Another feature of this aspect of the present inventions may be that the developer application determines the destination network service in reaction to execution of the incoming command from the human system operator client. Another feature of this aspect of the present inventions may be that the developer application includes an interception mode in which original destination network service network addresses are used to communication with the at least one network service, and a proxy mode in which proxy endpoints are used to communicate with the at least one network service. Another feature of this aspect of the present inventions may be that the developer application uses a service account to authenticate with the at least one network service, and the authenticated human system operator identity is associated with each use of the service account with the at least one network service.

In still another aspect, the present inventions may include a system for testing a new version of a software application, the system comprising: a server including program instructions configured to: receive an incoming command from a human system operator client, wherein the incoming command requires communication of network traffic between the server and a network service in order for the command to be satisfied; send the incoming command to an active container task corresponding to an active software application and to a new container task corresponding to the new version of the software application; send outbound network service traffic from the active container task to the network service; suppress outbound network service traffic from the new container task from being sent to the network service; compare preselected portions of the outbound network service traffic from the active container task with corresponding preselected portions of the outbound network service traffic from the new container task; and identify any differences between the preselected corresponding portions of the outbound network service traffic from active container task and the outbound network service traffic from the new container image. Another feature of this aspect of the present inventions may be that the server is further configured to: store the results of the comparison between the preselected portions of the outbound network service traffic from the active container task with the corresponding preselected portions of the outbound network service traffic from the new container task; send inbound network service traffic from the network service to the active container task; shape the inbound network service traffic from the network service to correspond to the outbound network service traffic from the new container task; and send the shaped inbound network service traffic to the new container task.

Other features, aspects and advantages of the present inventions will become apparent from the following discussion and detailed description.

BRIEF DESCRIPTION OF THE DRAWINGS

FIGS. 3A and 3B further show a specific embodiment of an overall architecture of capturing an audit trail against the human system operator identity using containers and container tasks by interception of traffic through pre-configured perpetual proxy endpoints.

While the inventions will be described in connection with the preferred embodiments, it will be understood that the scope of protection is not intended to limit the inventions to those embodiments. On the contrary, the scope of protection is intended to cover all alternatives, modifications, and equivalents as may be included within the spirit and scope of the inventions as defined by the appended claims.

DETAILED DESCRIPTION OF THE INVENTION

A container is software that packages code to execute in a minimal operating system environment (OS) making the code more portable from environment to environment. See Docker Inc. (2022 Oct. 19). What is a container? Docker. Retrieved Nov. 25, 2022, the contents of which are fully incorporated herein by reference. Containerization does not virtualize the hardware like virtual machines (VM) would, but rather virtualize the software to execute an OS kernel in the user space leveraging abstractions built on the host kernel's user space without allowing the containerized application to directly access the host OS kernel space. See or userland; "userland, n." The Jargon File. Eric S. Raymond. Retrieved Nov. 25, 2022, and "Kernel". Linfo. Bellevue Linux Users Group. Retrieved Nov. 25, 2022, the contents of which are fully incorporated herein by reference.

Running a containerized operating system and packaged application leads to benefits in security, making it faster to create and destroy containerized application instances compared to virtualized or bare metal application instances since the setup of kernel space on virtual machines (VMs) and bare metal hardware tends to be a longer process than booting a jailed kernel on abstractions built on user space, due to the initialization of the hardware resources involved with the former. See "Containers vs virtual machines"-your cheat sheet to know . . . akamai. (n.d.). Retrieved Nov. 26, 2022, and Rad, Bashari et al. "An Introduction to Docker and Analysis of its Performance." (2017), the contents of which are fully incorporated herein by reference.

Further defining terms related to techniques attributed to containerization, a container image (supra.) contains the packaged application with a minimal operating system to be executed on the container environment, and a container task is a process on the host operating system responsible for processing computational workloads with container image packaged application optionally ingressing and egressing network traffic. See Docker Inc. (2022, November 25). *How services work*. Docker Documentation. Retrieved Nov. 26, 2022, from https://docs.docker.com/engine/swarm/how-swarm-mode-works/services/, the contents of which are fully incorporated herein by reference. A webassembly interpreter may also be used in place of a container task to implement the methods of this disclosure.

Figure 1:
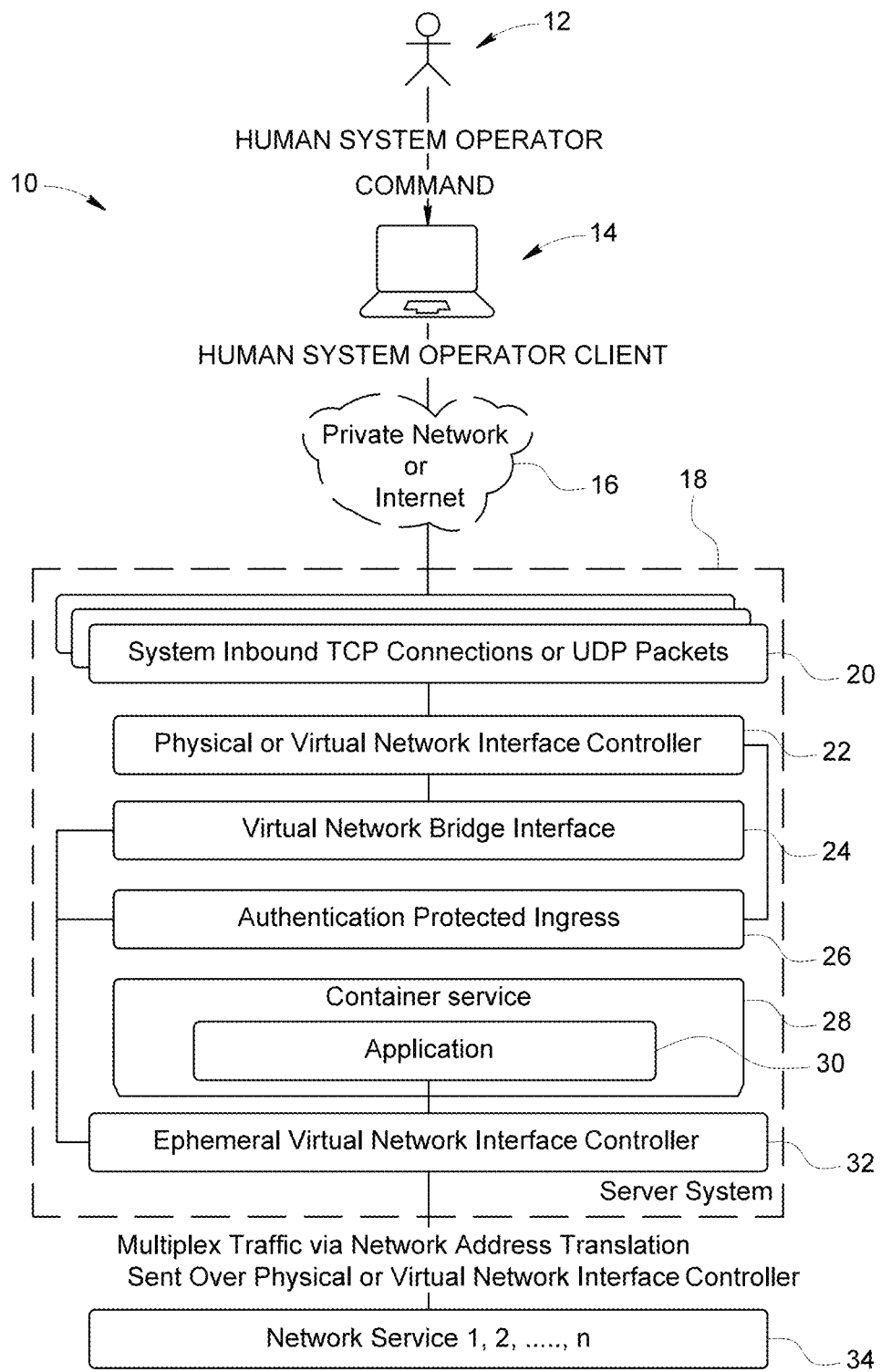
FIG. 1 is an overview of a specific embodiment of a containerized system in accordance with the present inventions and includes a specific embodiment of an overall architecture of capturing an audit trail against a legal entity human system operator identity using containers and container tasks by interception or stuffing partitioned encapsulation of traffic through ephemeral virtual network interfaces. See Stefan Savage. (2015 Apr. 6). Lecture 4: Layers & Framing. CSE 123, Spring 2015: Computer Networks. Retrieved Jan. 7, 2023, the contents of which are fully incorporated herein by reference.
Figure 10:
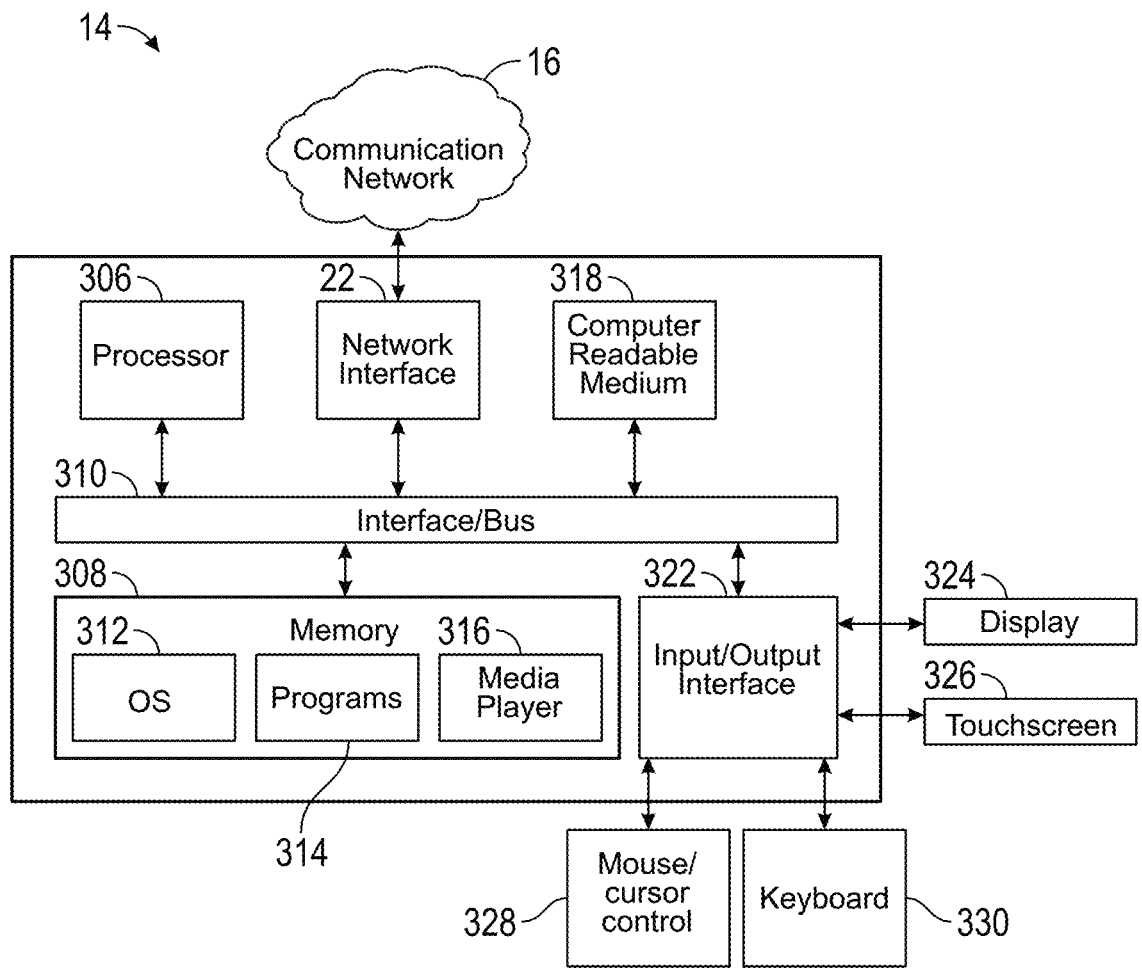
FIG. 10 is a schematic representation of a computer that may be used to implement all or part of the present inventions.

The methods and systems described herein leverage the aforementioned advantage of creating and destroying containers and container tasks servicing application instances over virtualized or bare metal computational resources to contextualize the network activity of containerized applications to the identity of a human system operator. With reference to FIG. 1, a specific embodiment of a containerized system 10 is shown. A human system operator 12 provides input commands to a computer device 14 (or human system operator client), such as a desk top computer, a lap top computer, a tablet computer or a smartphone, for example. The general structure and operation of an example of computer device 14 is shown in FIG. 10 and discussed below. A human system operator 12 is also commonly referred to as a user or a machine operating legal entity, and is not to be confused with a system or central data custodian. The computer device 14 is in communication over a communication network 16 (e.g., the internet or any other network) with a server 18, which may be a cloud server or a cluster or bank of multiple servers. The server 18 may also include the same structure and operation as the computer 14 as shown in FIG. 10.

With reference to FIG. 1, in a specific embodiment, the server 18 may include system inbound TCP connections or UDP packets 20, a physical or virtual network interface controller 22 (such as the network interface controller 22 shown in FIG. 10), a virtual network bridge interface 24, an authentication protected ingress 26, a container service 28 including a developer application 30, and an ephemeral virtual network interface controller 32. The developer application 30 may be a developer software application provided by a third party customer to the operator of the containerized system 10, and may also be the application container image referenced in FIG. 4A. The ephemeral virtual network interface controller 32 is a software version of the physical network interface controller 22. The server 18 is in communication (such as via a communication network) with one or more network services 34. Non-limiting examples of network services 34 might include a phone call service, a text message service, a database service, an image storage and retrieval service, etc. As will be discussed in more detail below, the present inventions improve functioning of computer technology by making new, innovative and more efficient uses of the network interface controller 22 in the server 18.

In distributed system deployments, containerized network applications often rely on supplementary network services (such as network services 34) to fulfill their purpose, often making use of service accounts (supra.) Usage of service accounts introduces new challenges in the fields of security and compliance for distributed systems, as the liability of side-effect activities of a human system operator initiated activities are obfuscated by intermediate machine identities. See *KPMG*. (2021, May 10). The Hidden Security Risks from service accounts. KPMG LLP. Retrieved Nov. 26, 2022, from https://advisory.kpmg.us/articles/2021/hidden-security-risks-service-accounts.html, the contents of which are fully incorporated herein by reference.

Figure 4A:
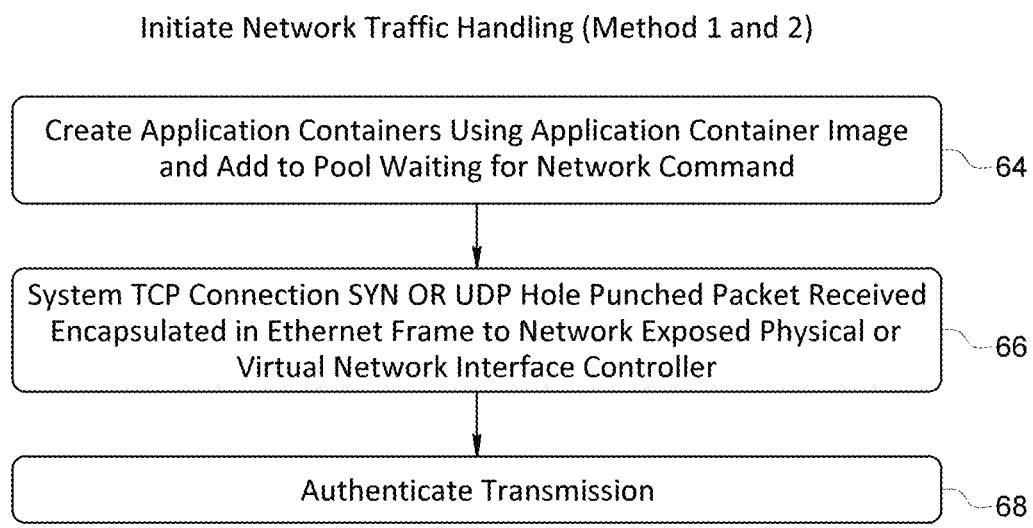
FIG. 4A illustrates a specific embodiment of a method to initial network traffic handling through the creation of application containers or virtual servers.
Figure 4B:
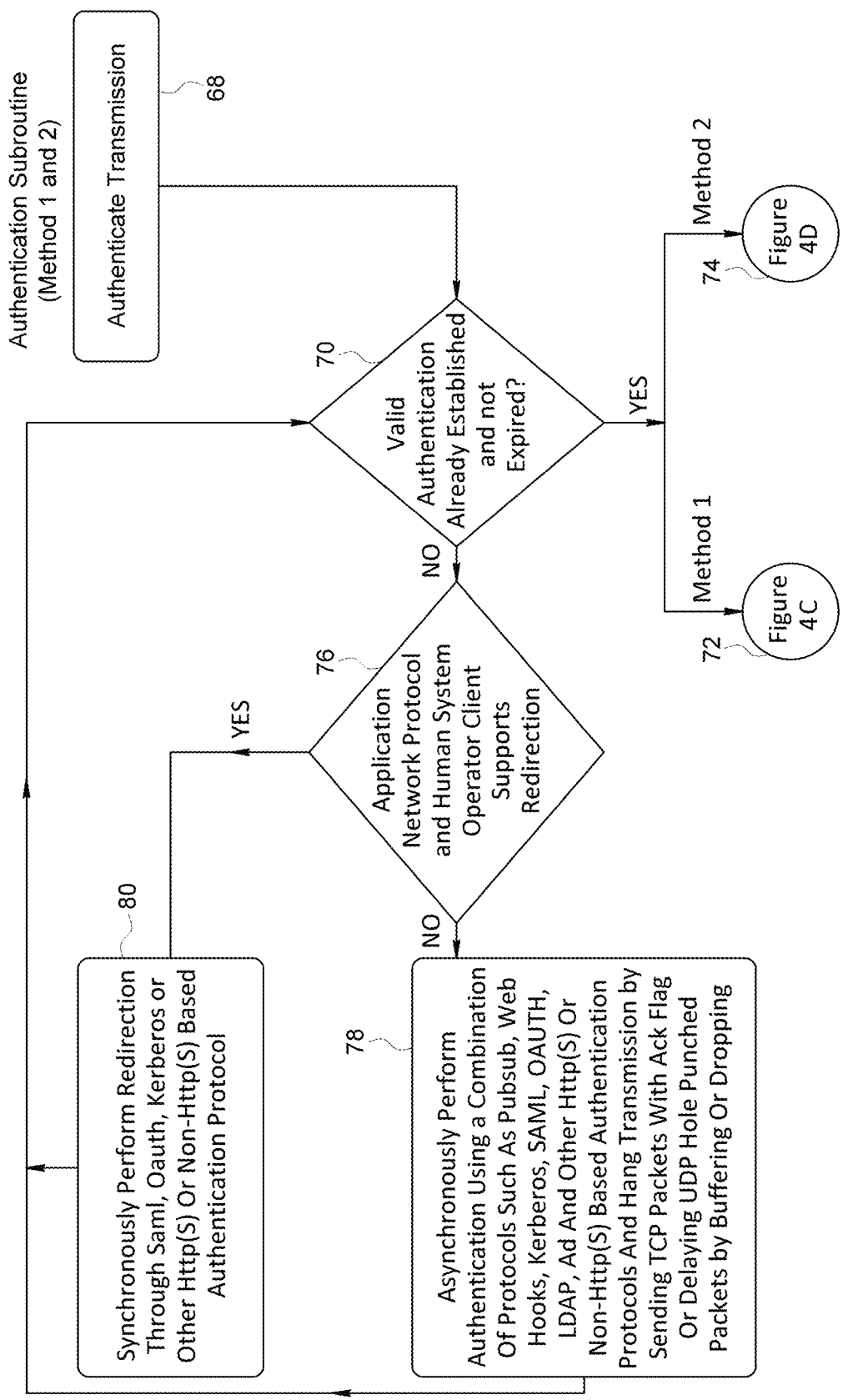
FIG. 4B illustrates a specific embodiment of an authentication subroutine that may be used to perform the authenticate transmission step 68 in FIG. 4A.
Figure 4C:
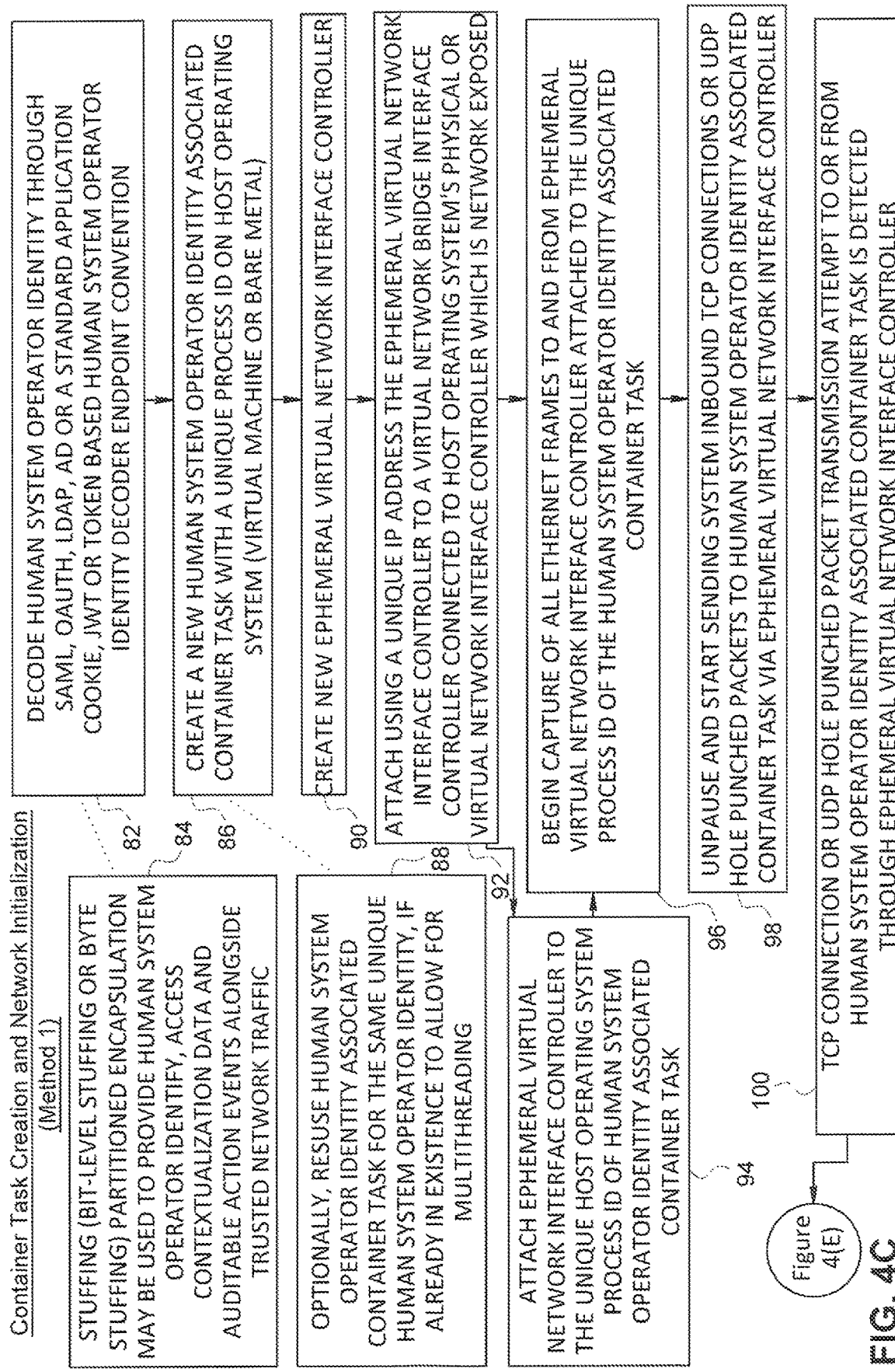
FIG. 4C illustrates a specific embodiment of a method for container task creation and network initialization when using the interception method.
Figure 4D:
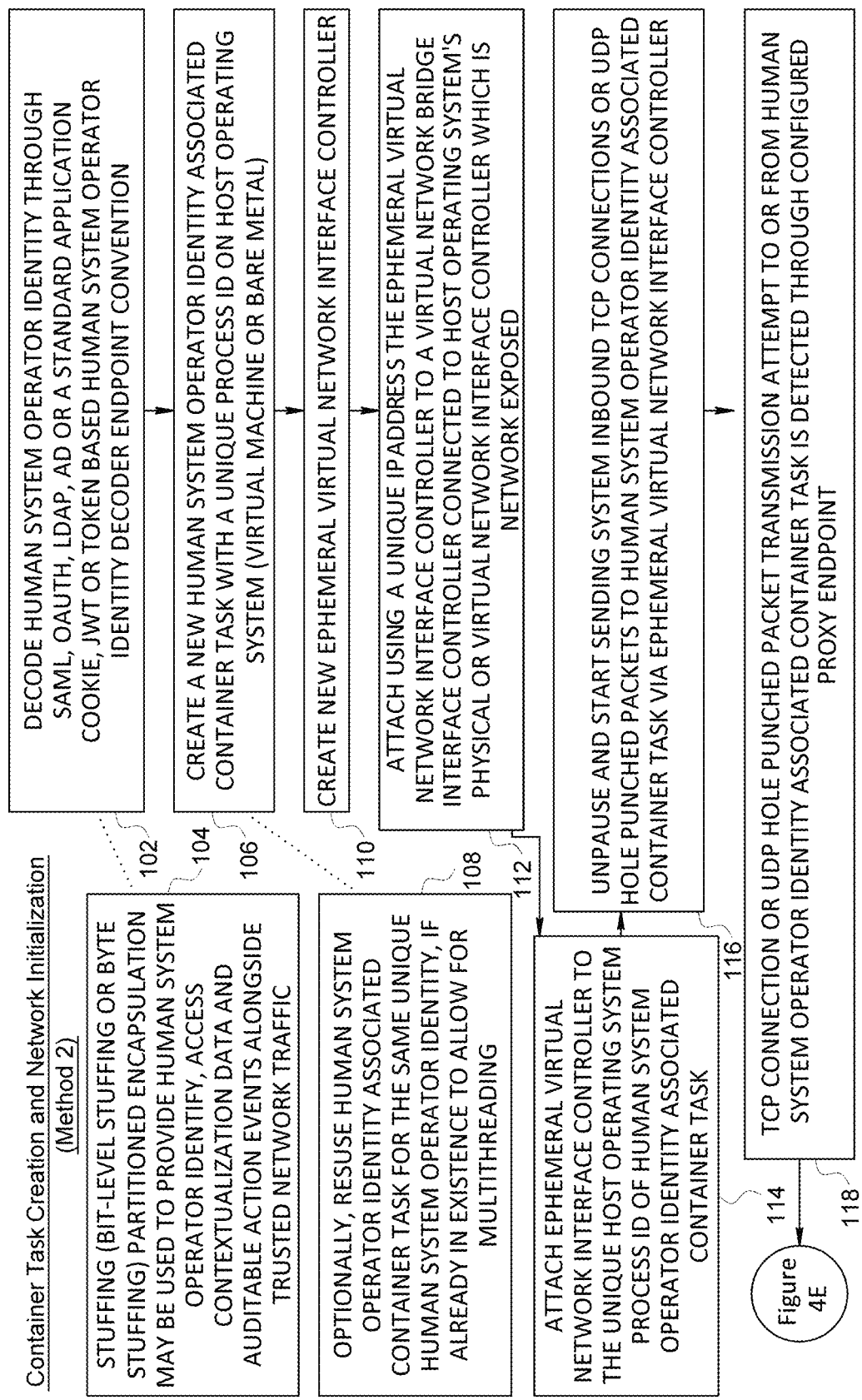
FIG. 4D illustrates a specific embodiment of a method of container task creation and network initialization when using the proxy method.

Therefore, the methods and systems described herein allow for associating network traffic originated by the actions (supra.) of a human system operator 12 to be associated to ephemeral container instances and container tasks servicing a containerized network application, as shown in FIGS. 4C and 4D, allowing for all time-stamped side-effect network transactions of the ephemeral container instances and tasks to be auditable under the identity of the human system operator whose action initiated the inbound system network message which led to such side-effect network transactions. In particular, the methods and systems described in this disclosure, make novel use of a network interface controller 22 by ensuring that the network traffic of the workloads initiated for and by a particular human system operator 12 is transmitted and tracked in association with the identity of the given human system operator's 12 identity using techniques including but not limited to machine instruction opcode and hardware virtualization, containerization technology, and network address translation algorithms.

Figure 2A:
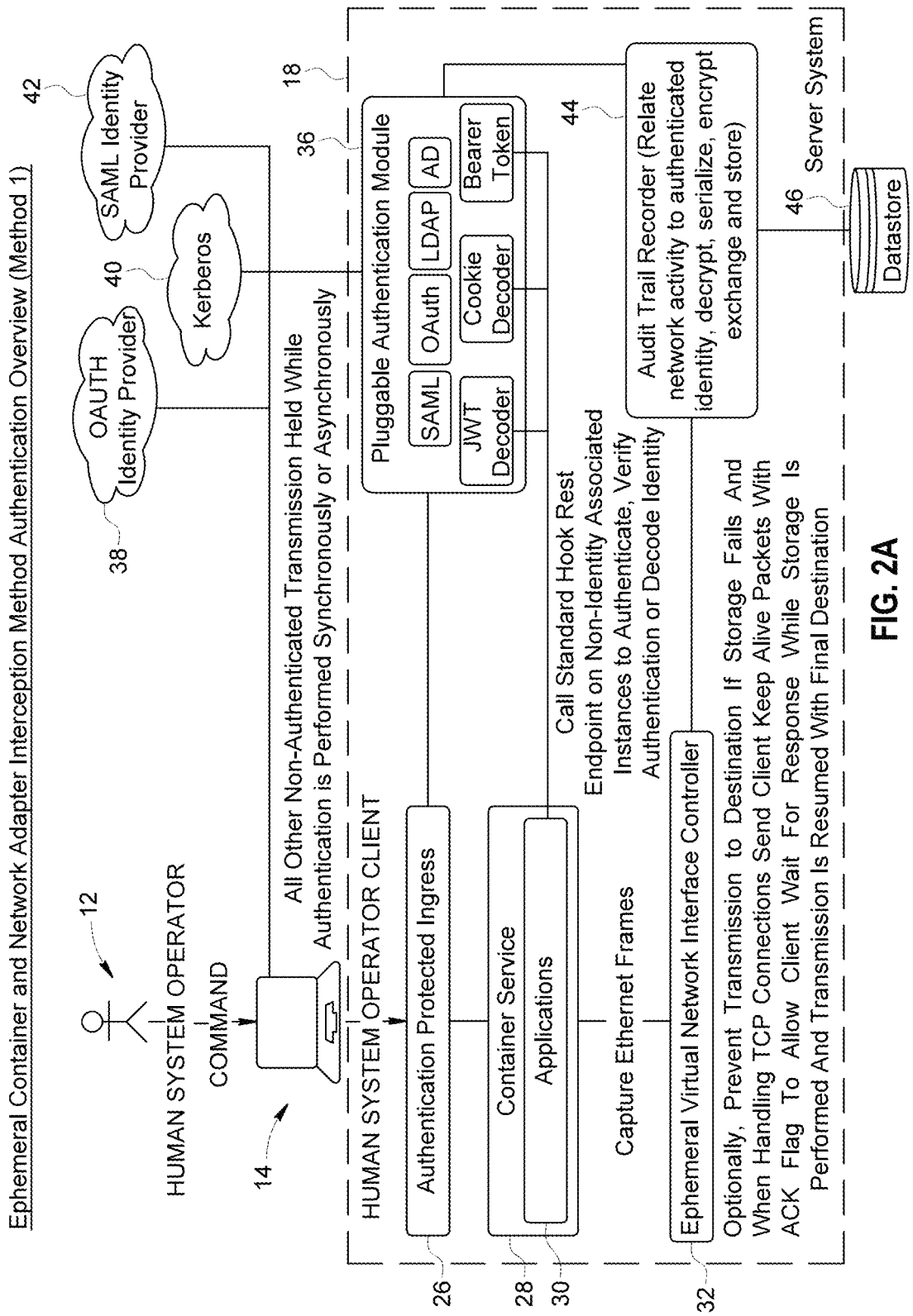
FIGS. 2A and 2B illustrate a specific embodiment of a containerized system in which an interception method may be used to associate the identity of a human system operator with an incoming request from human system operator client.

In a specific embodiment, a first step in implementing the present inventions may be to associate the identity of the human system operator 12 with an incoming request or command from the computer 14 to the server 18. In a specific embodiment, with reference to FIGS. 2A and 2B, an interception method may be used to associate the identity of the human system operator 12 with the incoming request from the computer 14 to the server 18. Referring initially to FIG. 2A, when the human system operator 12 signs in through the computer 14 with that person's username and password, that information is passed to a pluggable authentication module 36 running on the server 18. In a specific embodiment, the pluggable authentication module 36 may include various methods that may be employed to authenticate the human system operator 12, such as, SAML, OAuth, LDAP, AD, JWT Decoder, Cookie Decoder and Bearer Token, for example. The methods on the top row of module 36 (i.e., SAML, Oauth, LDAP, and AD) obtain the identity of the human system operator 12 from another network service such as Oauth Identity Provider 38, Kerberos 40, or SAML Identity Provider 42, not from the application 30 itself. It is noted that, in a specific embodiment, all other non-authenticated transmissions may be held by hanging while authentication is being performed synchronously or asynchronously. The authentication methods on the bottom row of module 36 (i.e., JWT Decoder, Cookie Decoder, and Bearer Token) obtain the identity of the human system operator 12 from the application 30. In a specific embodiment, the server 18 may capture ethernet frames or traffic from the container service 28 to the outside network services 34. In a specific embodiment, this step may correspond to step 96 in FIG. 4C, as discussed below. In a specific embodiment, the server 18 may also include an audit trail recorder 44 to record the transmissions corresponding to the identity of the human system operator 12 that are going out to the network services 34. The network activity may be stored in a datastore 46. In a specific embodiment, the audit trail recorder 44 may decrypt, serialize, encrypt and store network transmission data. In a specific embodiment, the server 18 may prevent transmission of requests to the network services 34 if the network requests and transmission data is first stored. In a specific embodiment, when handling TCP connections the server 18 may send keep alive packets with an ack flag to the human system operator client 14 to allow the client 14 to wait for a response while storage is performed and transmission is resumed with final destination.

Figure 2B:
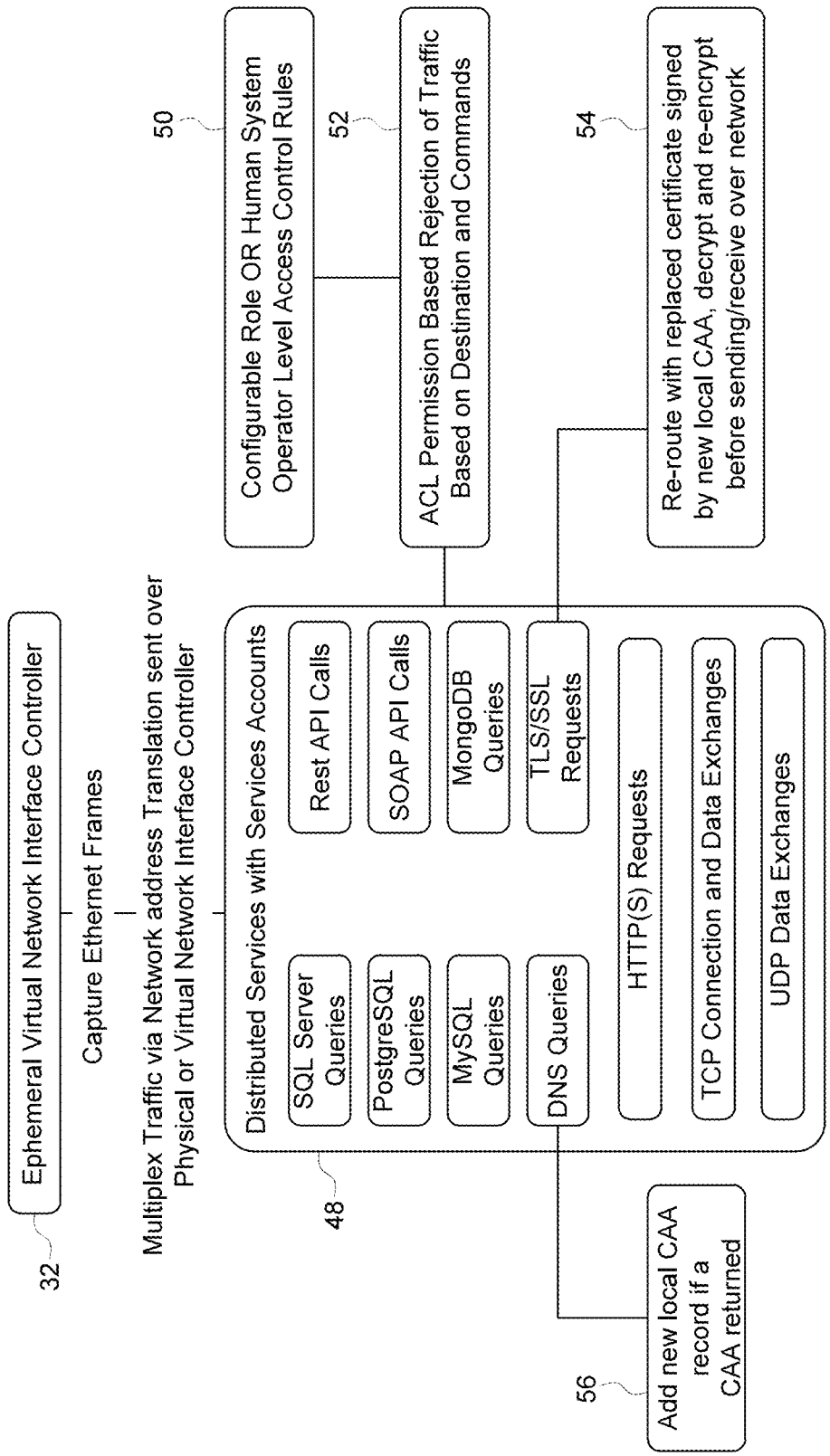

Referring to FIG. 2B, a continuation of FIG. 2A is shown. The ephermal virtual network interface controller 32 (which, as discussed elsewhere herein, is a software version of the physical network controller 22) shown at the top of FIG. 2A is part of the server 18, as shown at the bottom of FIG. 2A. In a specific embodiment, the network traffic or ethernet frames coming from the container service 28 and going to the network services 34 is captured as it is going to the network services 34. Examples of distributed services with service accounts 48 that may send various types of requests to network services 34 include, for example, SQL server queries, PostgreSQL queries, MySQL queries, DNS queries, REST API calls, SOAP API calls, MongoDB queries, TLS/SSI requests, HTTP(s) requests, TCP connection and data exchanges, and UDP data exchanges. The system 10 may include configurable role or human system operator level access control rules (ACL) 50, which will tell the system whether the human system operator 12 that is identified during the authentication process is or is not authorized to make the request that is being made. As shown at box 52, if the access control rules 50 indicate that the human system operator 12 is not permitted to make a particular request then the system 10 will reject the request. At box 54, if the container service 28 is sending encrypted traffic to a network service 34, then a new certificate signed by a new local Certificate Authority Authorization (CAA) replaces the original CAA, and the new local CAA is decrypted and re-encryted and then re-routed before the request is sent or received over the network to or from the network service 34 or server 18. At box 56, if a CAA is returned then a new local CAA may be created and added.

Figure 3A:
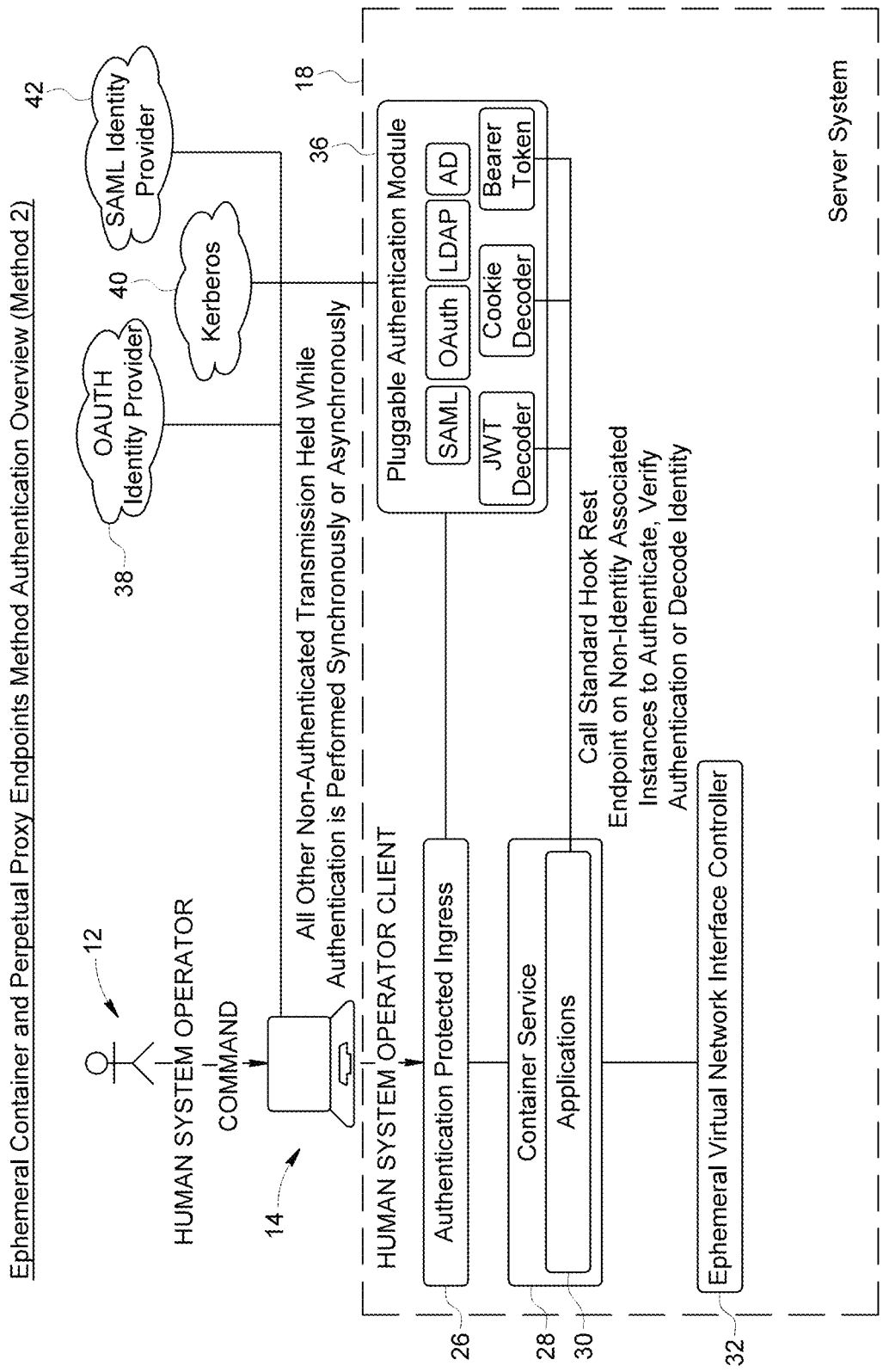
FIGS. 3A and 3B illustrate a specific embodiment of a containerized system in which a proxy method may be used to associate the identity of a human system operator with an incoming request from human system operator client.
Figure 3B:
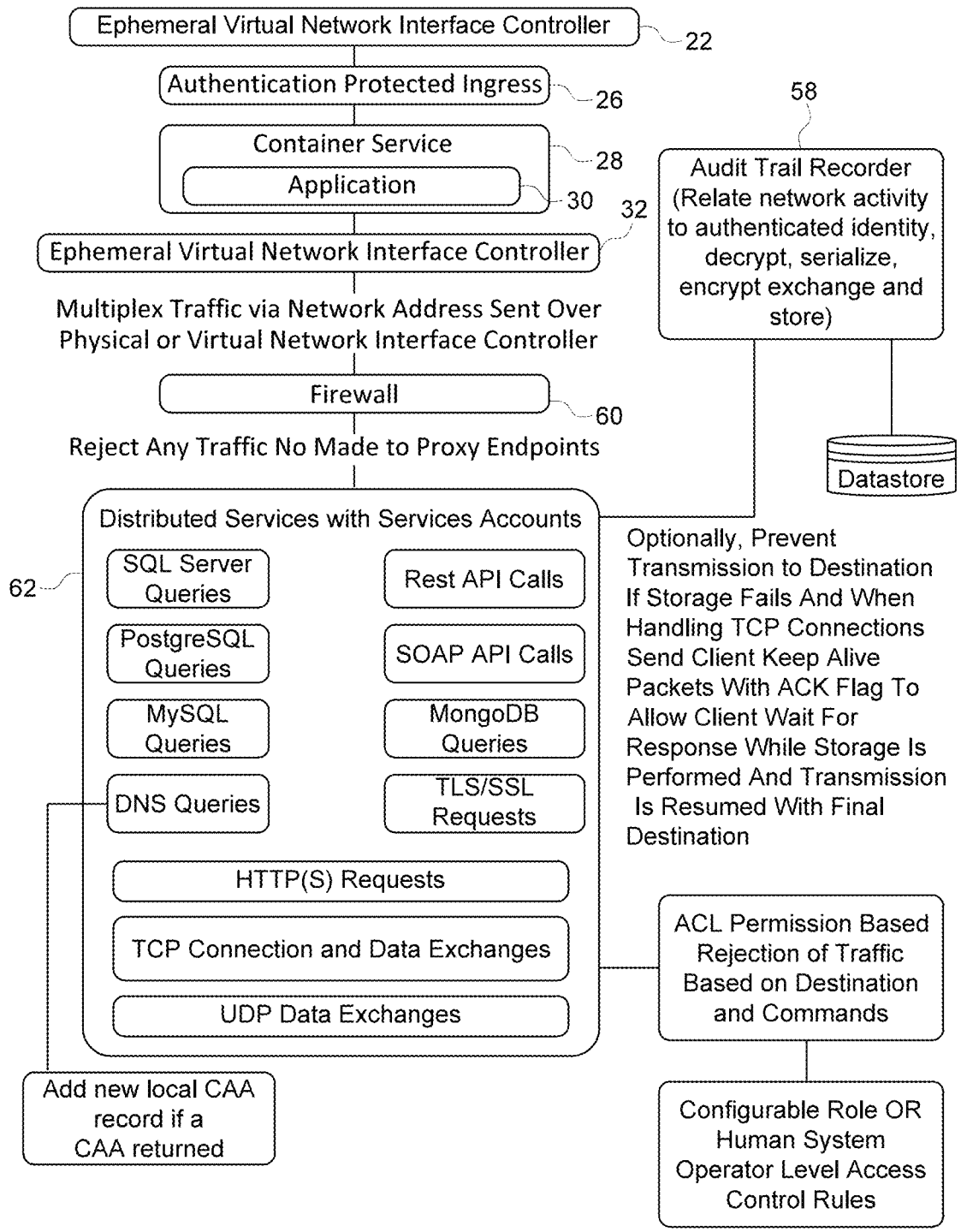

In a specific embodiment, as an alternative to using an interception method to associate the identity of the human system operator 12 with an incoming request from the computer 14 to the server 18 (as shown in FIGS. 2A and 2B), in another specific embodiment, a proxy method may be used, as shown in FIGS. 3A and 3B. In a specific embodiment, the developer application 30 may instruct the system 10 whether to use an interception method or a proxy method. With the proxy embodiment, FIG. 3A is the same as FIG. 2A in the interception embodiment, except that the proxy embodiment shown in FIG. 3A does not include an audit trail recorder within the server 18 and it is not necessary to capture ethernet frames corresponding to transmissions to/from the container service 28. Instead, as shown in FIG. 3B, an audit trail recorder 58 is included at the proxy level.

With reference to FIG. 3B, it can be seen in a proxy embodiment that the system 10 may include a firewall 60 between the ephemeral virtual network interface controller 32 in the server 18 and proxy endpoints 62 to distributed services with service accounts. In the proxy embodiment, the system 10 needs to know ahead of time which network services 34 the container service 28 will need to access. With the interception method discussed above, however, the system does not have advance notice of which network services 34 will be accessed. Hence, in the interception embodiment, the network requests coming from the container service 28 are "intercepted" on the fly and processed once the system 10 learns from the request what network services 34 need to be accessed. Referring again to FIG. 3B for the proxy embodiment, box 62 includes the same examples of network requests as shown at box 48 for the interception embodiment shown in FIG. 2B. As shown in FIG. 3B, the audit trail recorder 58 is located outside of the server 18 and in communication with the network queries shown at proxied endpoints 62.

Referring now to FIG. 4A, a specific embodiment of a method to initiate network traffic handling is illustrated. In a specific embodiment, the method of FIG. 4A may be used for both the interception and the proxy methods. At step 64, a batch of application containers or virtual servers (not virtual machines) are created using an application container image and held in a pool of application containers waiting for a network command to be received from the human system operator client 14. Instead of running a single software application on a single server, the present inventions greatly expand and extend the capacity or bandwidth of a single server by using the single server to create many virtual servers (or application containers) that are set aside in a pool of virtual servers/application containers that are placed on standby to be assigned to an incoming network command from the human system operator client 14 and then used to separately process the incoming command. Each of these virtual servers/application containers and assigned network commands are then used to improve computer security and functionality as discussed in more detail below. As part of step 64, an application container image is provided from the developer customer wishing to have network commands from human system operators for its software processed by the containerized system 10. The application container image or "boot image" includes the software/application that will run on the virtual server/application container along with the operating system needed to run the software/application (e.g., DOS, Unix, etc.). In other words, each application container (or virtual server) will be running the developer software/application and operating system for the software/application. Each time a network command is initiated by the human system operator 12 via the human system operator client 14 and the network request is routed via the network 16 to the server 18, one of the virtual servers/application containers created at step 64 is assigned to the incoming command for processing. At step 66, a system TCP connection syn or UDP hole punched packet 20 is received encapsulated in ethernet frame to network exposed physical or virtual network interface controller 22. Next, at step 68, the transmission is authenticated (see also authentication protected ingress 26 and pluggable authentication module 36 in FIGS. 2A and 3A). A specific embodiment of a method for authenticating a network command is shown in FIG. 4B.

Referring now to FIG. 4B, in a specific embodiment of an authenticate transmission process 68, the process may begin at step 70 by inquiring whether a valid authentication has already established and not expired. If yes, then the process may proceed to step 72 and to FIG. 4C for container creation and network initialization using the interception method (i.e., method 1) or to step 74 and to FIG. 4D for container creation and network initialization for the proxy method (i.e., method 2). If the answer at step 70 is no, then the process may proceed to step 76 to inquire whether the application network protocol and human system operator client supports redirection. For example, the system at this step 76 may determine what protocol was used to send the network command to decide whether to authenticate the transmission synchronously or asynchronously. If the answer at step 76 is no, then the process proceeds to step 78 so that authentication may be processed asynchronously. At this step, asynchronous authentication may be performed by using a combination of protocols such as Pubsub, Web Hooks, Kerboeros, SAML, Oauth, LDAP, AD and other http(s) or non-http(s) based authentication protocols and hang transmission by sending TCP packets with ack flag or delaying UDP hole punched packets by buffering or dropping. From step 78, the process proceeds to step 70 and from there on to steps 72 or 74, as explained above. If on the other hand, the answer at step 76 is yes, then the process proceeds to step 80 so that authentication may be processed synchronously. At step 80, synchronous authentication may be performed by redirection through SAML, Oauth, Kerberos or other http(s) or non-http(s) based authentication protocol. From there the process proceeds to steps 70 and 72 or 74, as explained above.

After the human system operator has been identified, such as described in FIG. 4B, the process may proceed to a container task creation and network initialization process. For the interception method, a specific embodiment of a container task creation and network initialization process is illustrated in FIG. 4C. For the proxy method, a specific embodiment of a container task creation and network initialization process is illustrated in FIG. 4D.

Referring to FIG. 4C, a specific embodiment of a process for container task creation and network initialization for an interception method may commence at step 82, where the system may decode the human system operator identity through SAML, OAuth, LDAP, AD or a standard application cookie, JWT or token based human system operator identity decoder endpoint convention. In a specific embodiment, this may be done via the pluggable authentication module 36 shown in FIG. 2A. Optionally, as shown in step 84, as part of step 82 the system may also employ stuffing (bit-level stuffing or byte level stuffing) partitioned encapsulation to provide the human system operator identity, access contextualization data and auditable action events to the network services 34 along side trusted network traffic. After step 82, the process may proceed to step 86 to create a new human system operator identity associated container task with a unique process ID on the host operating system, which may be running on a virtual machine or bare metal machine. Optionally, as shown at step 88, as part of step 86, the system may also reuse the human system operator identity associated container task for the same unique human system operator identity, if already in existence to allow for multi-threading if multiple commands are coming in to the server 18 from the human system operator client 14. After step 86, the process may proceed to step 90 to create a new ephemeral virtual network interface controller 32, as shown for example in FIG. 1. Next, at step 92, the process may attach using a unique IP address the ephemeral virtual network interface controller 32 created at step 90 to a virtual network bridge interface controller 24 (shown in FIG. 1), which is connected to the host operating system's physical or virtual network interface controller that is network exposed. By network exposed it is meant that the virtual network bridge interface controller 24 is connected to the network 16 without a firewall and can receive commands from the human system operator client 14. Next, at step 94, the ephemeral virtual network interface controller 32 is attached to the unique host operating system process ID of the human system operator identity associated container task. Next, at step 96, the process starts capturing all network frames to and from the ephermal virtual network interface controller attached to the unique process ID of the human system operator identity associated container task. Again, this task is the process that is running the application, which is contained in the virtual server/application container, wherein the task is executing on the host operating system. Next, at step 98, the process may unpause and start sending system inbound TCP connections or UDP hole punched packets to the human system operator identity associated container task via the ephemeral virtual network interface controller. Next, at step 100, the process detects attempted TCP connections or UDP hold punched packet transmissions to or from the human system operator identity associated container task via the efhemeral virtual network interface controller. Next, the process may proceed to the process set forth in FIG. 4E.

At this point, in a specific embodiment, we have a server 18 that has an operating system, which is referred to herein as a host operating system. We also have an application container that contains a developer software application and an operating system needed to run that software application. The application container runs on the host operating system. We also have a container task that is associated with a unique process ID on the host operating system. The unique process ID is attached to an emphemeral virtual network interface controller, which is attached to a virtual network bridge interface, which is attached to the host operating system. The host operating system is associated with its own physical or virtual network interface controller, which is network exposed. The container task is also associated with a unique IP address. The container task is a process exucting on the host operating system, which is the actual execution of the developer applications software (that is inside the application container) on the server 18. In a specific embodiment, the creation of the application container, the container task, the emphemeral virtual network interface controller, the virtual network bridge interface controller, and the various associations and connections of these items to each other as explained above, can all be accomplished through the use of available software products, such as "Containerd" and "CNI" software. As explained more fully elsewhere herein, this allows for the association of a container task with a single human system operator and a single network command inside an application container, and the ability to track and manage network traffic corresponding to that human system operator and command to and from network services in a secure and safe manner, including the ability to store and audit such network traffic. This represents a significant improvement in the functioning of computer technology, including in a more efficient and secure manner, as further discussed elsewhere herein.

Before proceeding to a discussion of FIG. 4E, a specific embodiment of a process for container task creation and network initialization for a proxy method is discussed in connection with FIG. 4D. It can be seen by comparing FIG. 4C (for the intercept method) and FIG. 4D (for the proxy endpoint method) that the processes in FIGS. 4C and 4D are identical with respect to steps 82 and 102, 84 and 104, 86 and 106, 88 and 108, 90 and 110, 92 and 112, 94 and 114, and 98 and 116. One key difference between FIGS. 4C and 4D is that FIG. 4D (the proxy endpoint method) does not include step 96 from FIG. 4C (intercept method) regarding capturing of ethernet frames to/from the ephemeral virtual network interface controller. Instead, in FIG. 4C, the process proceeds from step 114 to step 116 to unpause and start sending the system inbound TCP connections and UDP hole punched packets. The other difference between FIGS. 4C and 4D is with respect to the last steps, i.e., steps 100 and 118. In FIG. 4C (intercept method) and step 100, the attempted TCP connections and UDP hole punched packets to/from the human system operator identity associated container task is detected through the ephemeral virtual network interface controller 32, whereas in FIG. 4D and step 118, the detection is made through configured proxy endpoints (i.e., instead of frame capture the system relies on the container image application that the developer provides, as the developer for the proxy method will not call the network service directly). In this regard, it is noted that the firewall also stops the task from calling the network services directly. Instead, they are relying on the system's established or "proxy" access endpoints to the network services. After step 118, the process may proceed to FIG. 4E.

Figure 4E:
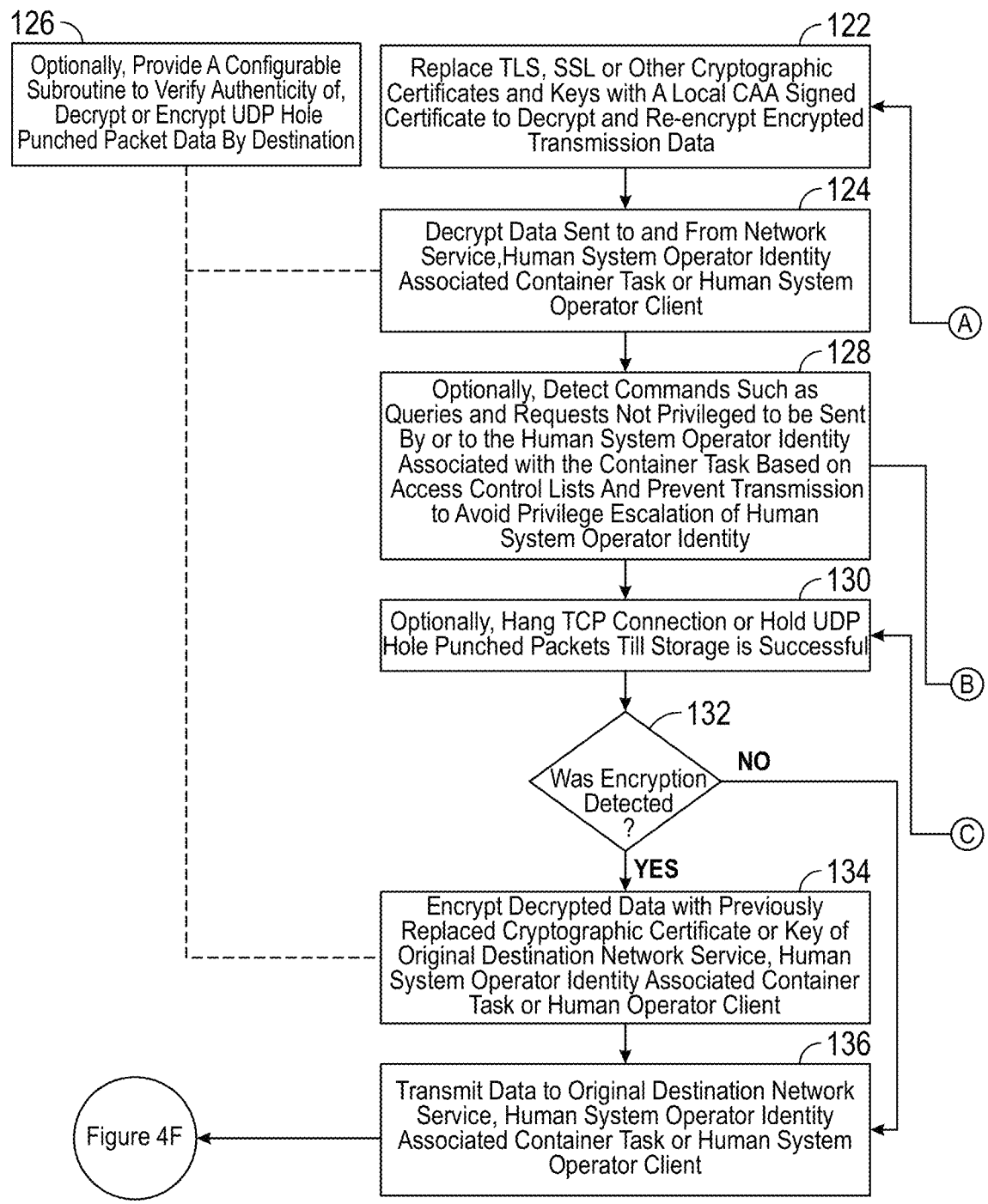
FIG. 4E illustrates a specific embodiment of a method for transmission handling according to one aspect of the present inventions.
Figure 4E:
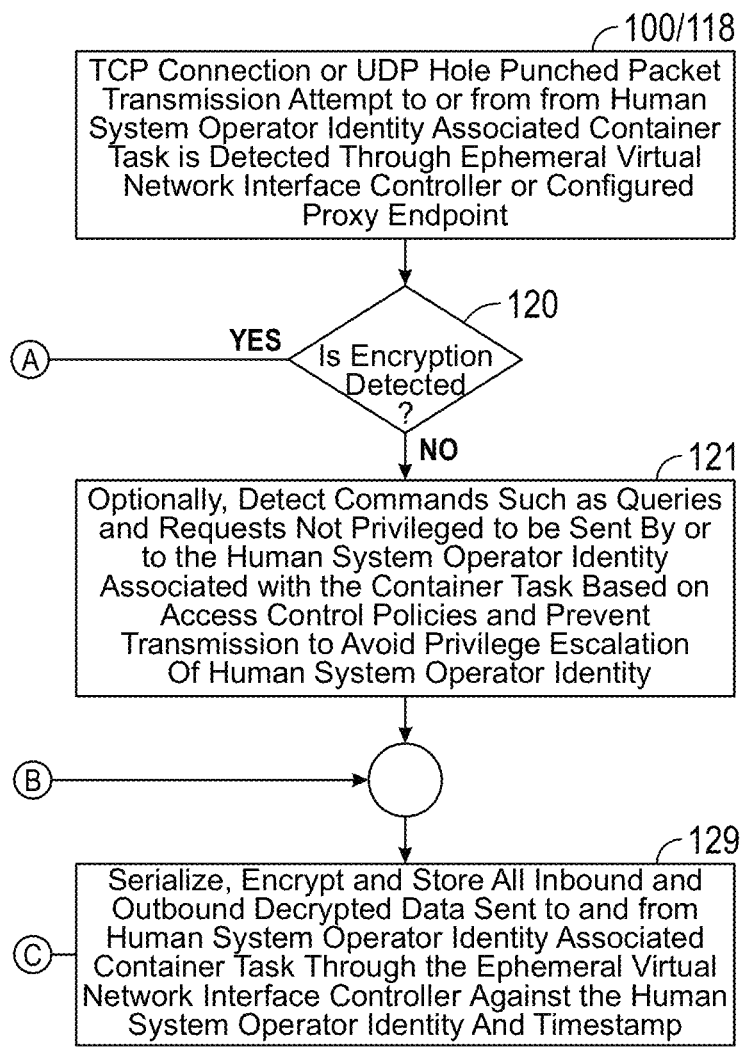

Referring now to FIG. 4E, a specific embodiment of a process for transmission handling is disclosed, which may be used for both the intercept method and the proxy method. Referring initially to step 100/118, this is a combination of steps 100 from FIG. 4C and 118 from FIG. 4D. Next, at step 120, the process determines whether encryption is detected. If the answer at step 120 is yes, then the process proceeds to step 122 where the process will replace TLS, SSI or other cryptographic certificates and keys with a local CAA signed certificate to decrypt and re-encrypt transmission data. Next, at step 124, the process decrypts data sent to and from network services, the human system operator identity associated container task, or the human system operator client. As shown at step 126, as part of step 124 the process may optionally provide a configurable subroutine to verify authenticity of, decrypt, or encrypt UDP hole punched packet data by destination. After step 124, the process proceeds to step 128, where the process may optionally detect commands such as queries and requests not privileged to be sent by or to the human system operator identity associated with the container task based on access control lists and prevent transmission to avoid privilege escalation of human system operator identity. Next, at step 129, the process may serialize, encrypt and store all inbound and outbound decrypted data sent to and from the human system operator identity associated container task through the emphemeral virtual network interface controller against the human system operator identity and timestamp. Next, at step 130, the process may optionally hang TCP connections or hold UDP hole punched packets until storage is successful. Next, at step 132, the process determines whether encryption was detected. If the answer at step 132 is yes, then the process proceeds to step 134 where the process encrypts decrypted data with the previously replaced cryptographic certificate or key of original destination network service, human system operator identity associated container task or human operator client. Next, at step 136, the process transmits data to the original destination network service, the human system operator identity associated container task or the human system operator client. If the answer at step 132 is no (i.e., no encryption was detected), then the process skips over step 134 and proceeds to step 136, as explained above. After step 136, the process proceeds to the process shown in FIG. 4F. Referring back to step 120, if the answer at step 120 is no, then the process proceeds to step 121, where the process may optionally detect commands such as queries and requests not privileged to be sent by or to the human system operator identity associated with the container task based on access control policies and prevent transmission to avoid privilege escalation of human system operator identity. Note that if the answer at step 120 is no (i.e., the data is not encrypted), this means the system can see the command going to the network services, inspect it, and stop it if the human system operator is not authorized to perform that task, i.e., it is privileged. After step 121, the process proceeds to step 129 and continues on from there as explained above. Referring again to step 136, after which the process proceeds to FIG. 4F, a discussion of FIG. 4F will now be provided.

Figure 4F:
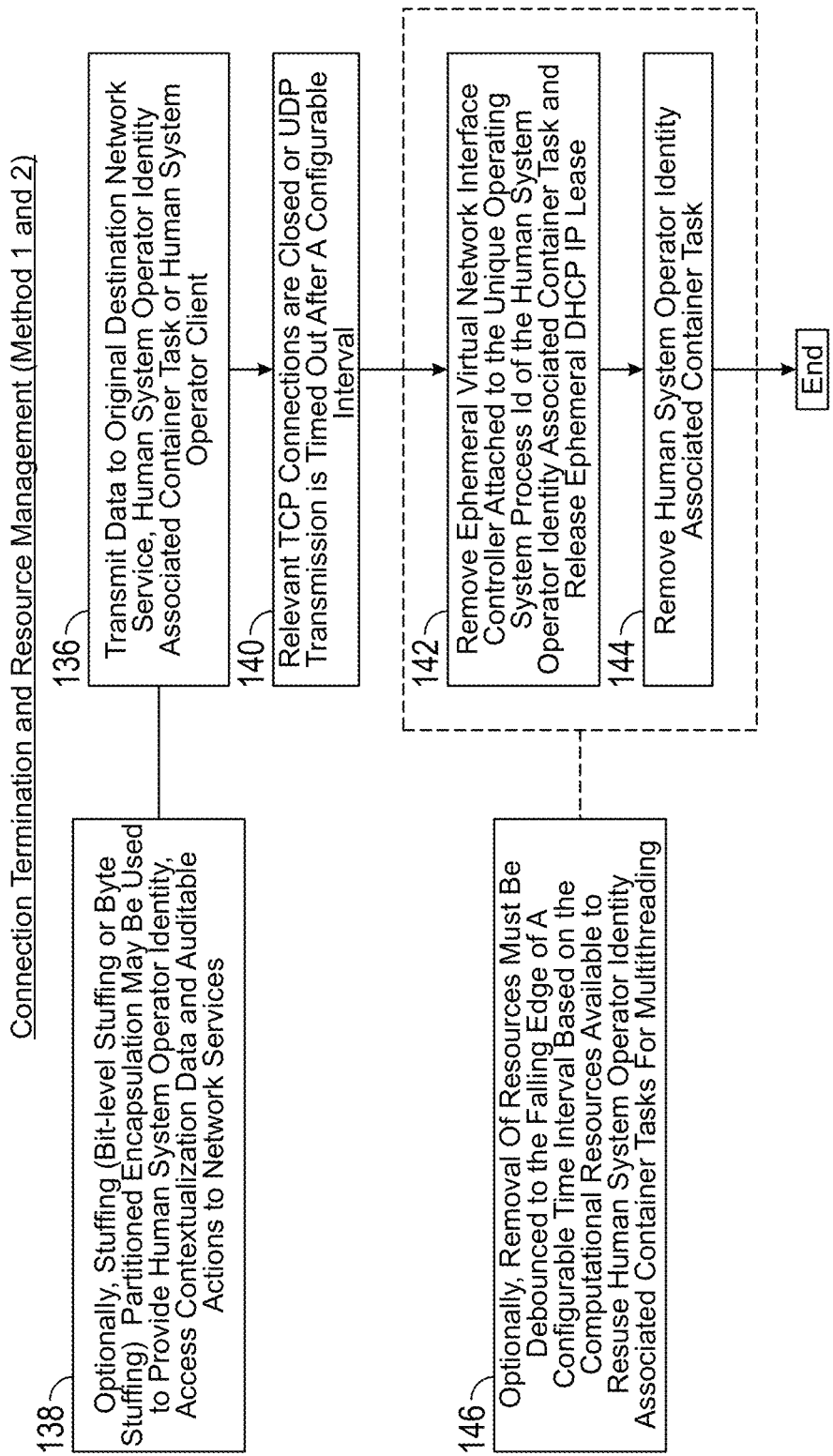
FIG. 4F illustrates a specific embodiment of a process for connection termination and resource management is illustrated according to one aspect of the present inventions.

Referring now to FIG. 4F, a specific embodiment of a process for connection termination and resource management is illustrated. Step 136 from FIG. 4E is shown in the upper right portion of FIG. 4F. Optionally, as part of step 136, stuffing (by bit-level stuffing or byte stuffing) partitioned encapsulation may be used to provide human system operator identity, access contextualization data and auditable actions to network services. After step 136, the process proceeds to step 140, where relevant TCP connections are closed or UDP transmission is timed out after a configuarable interval. Next, at step 142, the process may remove the ephemeral virtual network interface controller attached to the unique operating system process ID of the human system operator identity associated container task and release the emphemeral DHCP IP lease. Next, at step 144, the process may remove the human system operator identity associated container task. Optionally, as part of steps 142 and 144, at step 146, removal of resources must be debounced to the falling edge of a configurable time interval based on the computational resources available to reuse human system operator identity associated container tasks for multithreading. In other words, at step 146, the system may hang on to the human system operator identity associated container task for a selected time period to reuse it if another command comes in from the same human system operator client.

Figure 5:
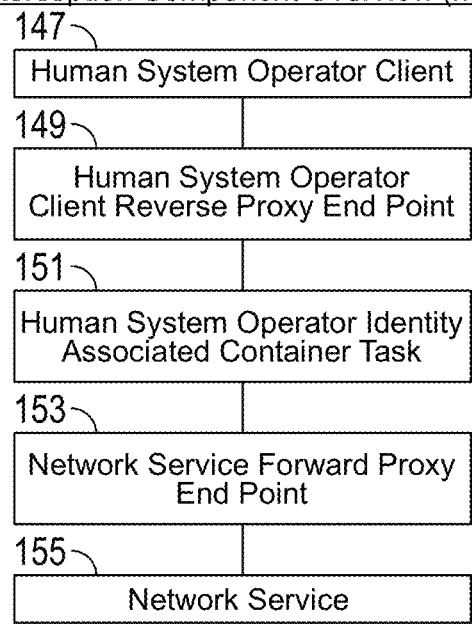
FIG. 5 is a high level overview of a specific embodiment of the components and their relationship to one another for use in the proxy method according to one aspect of the present inventions.

Referring now to FIG. 5, a proxy component overview is provided. In a specific embodiment, a proxy system may include a human system operator client 147, a human system operator client reverse proxy endpoint 149, a human system operator identity associated container task 151, a network service forward proxy endpoint 153, and a network service 155. The human system operator client reverse proxy endpoint 149 functions to process transmissions between the human system operator client 147 and the human system operator identity associated container task 151. The network service forward proxy endpoint 153 functions to process transmissions between the human system operator identity associated container task 151 and the network service 155.

Figure 6:
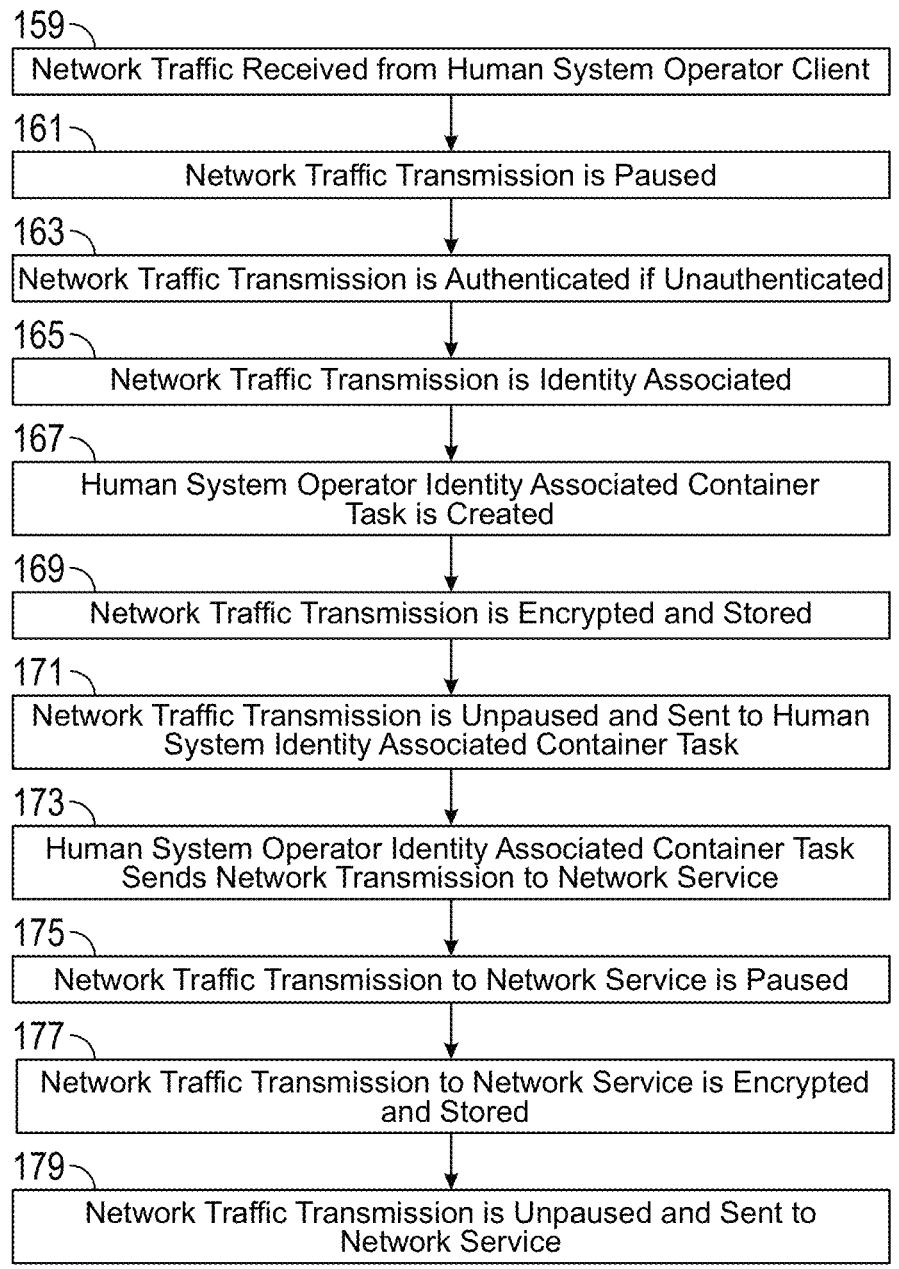
FIG. 6 is an overview of a specific embodiment of a method for human system operator identity association of multi-directional network traffic.

Referring now to FIG. 6, an overview of a specific embodiment of a method for human system operator identity association of multi-directional network traffic is provided. At step 159, network traffic is received from a human system operator client. Next, at step 161, network traffic transmission is paused. Next, at step 163, network traffic transmission is authenticated if not already authenticated. Next, at step 165, network traffic transmission is identity associated. Next, at step 167, a human system operator identity associated container task is created. Next, at step 169, network traffic transmission is encrypted and stored. Next, at step 171, network traffic transmission is unpaused and sent to the human system identity associated container task. Next, at step 173, the human system operator identity associated container task sends the network transmission to the network service. Next, at step 175, the network traffic transmission to the network service is paused. Next, at step 177, network traffic transmission to the network service is encrypted and stored. Next, at step 179, network traffic transmission is unpaused and sent to the network service.

Figure 7:
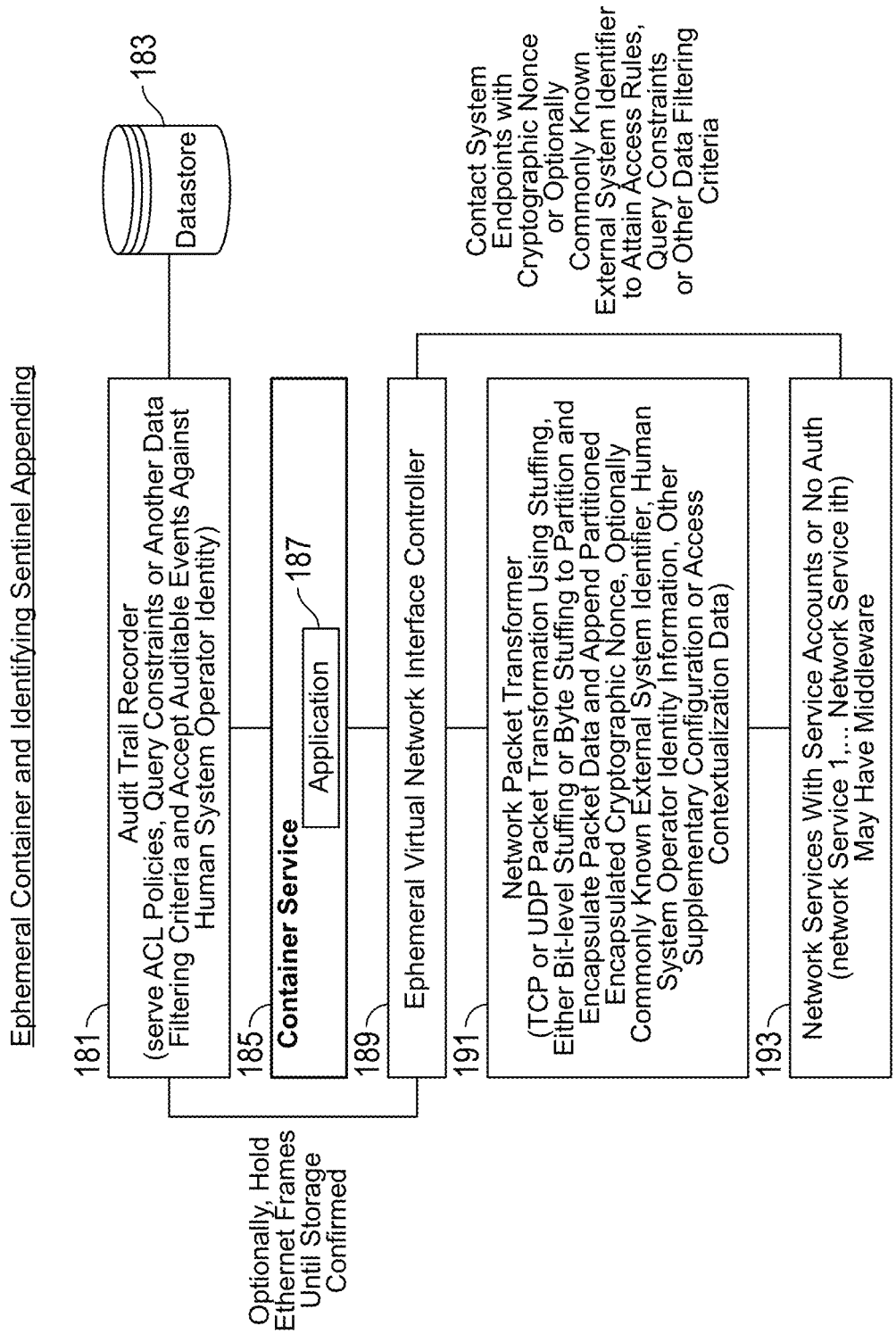
FIG. 7 illustrates an overview of a specific embodiment of an architecture for sending additional data along with a network transmission through the use of a separator sentinel.

Referring now to FIG. 7, an overview of a specific embodiment of an architecture for sending additional data along with a network transmission through the use of a separator sentinel will now be described. As mentioned above, such as in connection with FIGS. 4C and 4D, additional information may be appended to a transmission that is being sent to a network service. In a specific embodiment, as shown in FIG. 7, an audit trail recorder 181 may be connected to a datastore 183. The audit trail recorder 181 may be in communication with a container service 185 containing an application 187. The container service 185 may be in communication with an ephemeral virtual network interface controller 189. In a specific embodiment, together the audit trail recorder 181, container service 185, and ephemeral virtual network interface controller 189 may function to hold incoming network traffic, store it in the datastore 183, and then pass it on to a network packet transformer 191. In a specific embodiment, the network packet transformer may employ a prescribed mutually understandable network protocol to encapsulate TCP or UDP packet data to network services with Start of Text (STX) and End of Text (ETX) ASCII control code data or similar sentinel sequences, commonly referred to as stuffing (Savage, supra.), either bit-level stuffing (id.) or byte stuffing (id.), and accompany transmitted packet data with, supplementary stuffing partitioned encapsulated data with a cryptographic nonce, an optionally commonly known external system identifier identifiable to the human system operator identity, or the human system operator identity information itself. Appropriate de-encapsulation may be performed by a receiving network service 193, middleware or application to isolate transmitted data and process it in accordance to the human system operator identity associated with the traffic received. In essence, this may be viewed as a supplementary technique that positions a separator sentinel between the network traffic that is already being sent to the network service 193 and the additional data that may be desired to also send to the network service 193.

It is now apparent from the above description that the present inventions improve computer technology including by improving security and related legal compliance issues in connection with computer network transactions initiated from a human system operator client via a server to external network services. As discussed above, one of the problems addressed by the present inventions is that the use of service accounts according to the current state of the art to make use of external network services via a server suffer from a significant lack of security and related legal compliance issues. In particular, as discussed elsewhere herein, in the current state of the art, computer networks using service accounts are tied to a particular device. The system implementing the command to access external network services only knows the identity of the particular device that initiates an incoming command. The system does not know the identity of the human system operator who initiated the command via the known device. As such, the system does not know whether said human system operator is authorized to execute the incoming command and access the corresponding network services. This represents a security flaw and related legal compliance gap in current systems.

The problem with secure use of distributed computer network transactions and related legal compliance requirements can be found in a variety of industries, including regulated industries such as healthcare. For example, in order to safeguard the health and safety of patients, it is important that rogue human system operators are not allowed to access and initiate certain transactions in various health related computer networks that could cause harm to the health of a large population of patients, for example. The present inventions address and solve this problem through employment of the various methods and systems described herein, including by ascertaining the identity of the human system operator and then tracking incoming network commands initiated by said human system operator and blocking such commands from accessing external network services when it is determined that the human system operator lacks authority to carry out such commands. The present inventions may further address and solve related problems, including compliance with legal security requirements related to such commands and corresponding network service communications (e.g., 21 CRF § 11.10), such as by storing and auditing an electronic trail of such transmissions, including on a command-by-command and operator-by-operator basis.

The present inventions address and overcome the above-described problems. For example, in one aspect, in a specific embodiment, the present inventions may address and overcome these problems by receiving an incoming command from a human system operator client, wherein the incoming command requires communication of network traffic between the server and at least one network service in order for the command to be satisfied; determining the identity of a human system operator corresponding to the command by authenticating the command; associating the identity of the identified human system operator with the incoming command; creating an application container including a developer application and an operating system for executing the developer application; assigning the application container to the incoming command; determining if the identified human system operator is authorized to execute the incoming network command and subsequent network service commands; if the identified human system operator is not authorized to execute the incoming network command and subsequent network service commands, then sending a response back to the human system operator client denying the incoming command; if the identified human system operator is authorized to implement the incoming command and subsequent network service commands, then: sending network traffic to the network service corresponding to the incoming command; receiving a response from the network service corresponding to the incoming command; sending a response back to the human system operator client to complete processing of the incoming command; storing network traffic between the human system operator client and the server that corresponds to the incoming command and the identity of the human system operator; and storing network traffic between the server and the network service that corresponds to the incoming command and the identity of the human system operator.

In a more detailed aspect of the above specific embodiment, assigning the application container to the incoming command may be accomplished by creating a human system operator identity associated container task with a unique process ID on a host operating system on the server; creating an ephemeral virtual network interface controller; attaching the ephemeral virtual network interface controller to a virtual network bridge interface controller that is connected to a network interface controller in the server and associated with the host operating system; attaching the ephemeral virtual network interface controller to the unique host operating system process ID of the human system operator identity associated container task; and sending incoming network traffic corresponding to the incoming command to the human system operator identity associated container task.

In a still further more detailed aspect of the above specific embodiments, a unique IP address corresponding to the unique process ID may be used to attach the ephemeral virtual network interface controller to the virtual network bridge interface controller.

In a still further more detailed aspect of the above specific embodiments, the present inventions may capture ethernet frames to and from the ephemeral virtual network interface controller attached to the unique process ID of the human system operator identity associated container task after the ephemeral virtual network interface controller is attached to the unique host operating system process ID of the human system operator identity associated container task and before incoming network traffic corresponding to the incoming command is sent to the human system operator identity associated container task.

Figure 8:
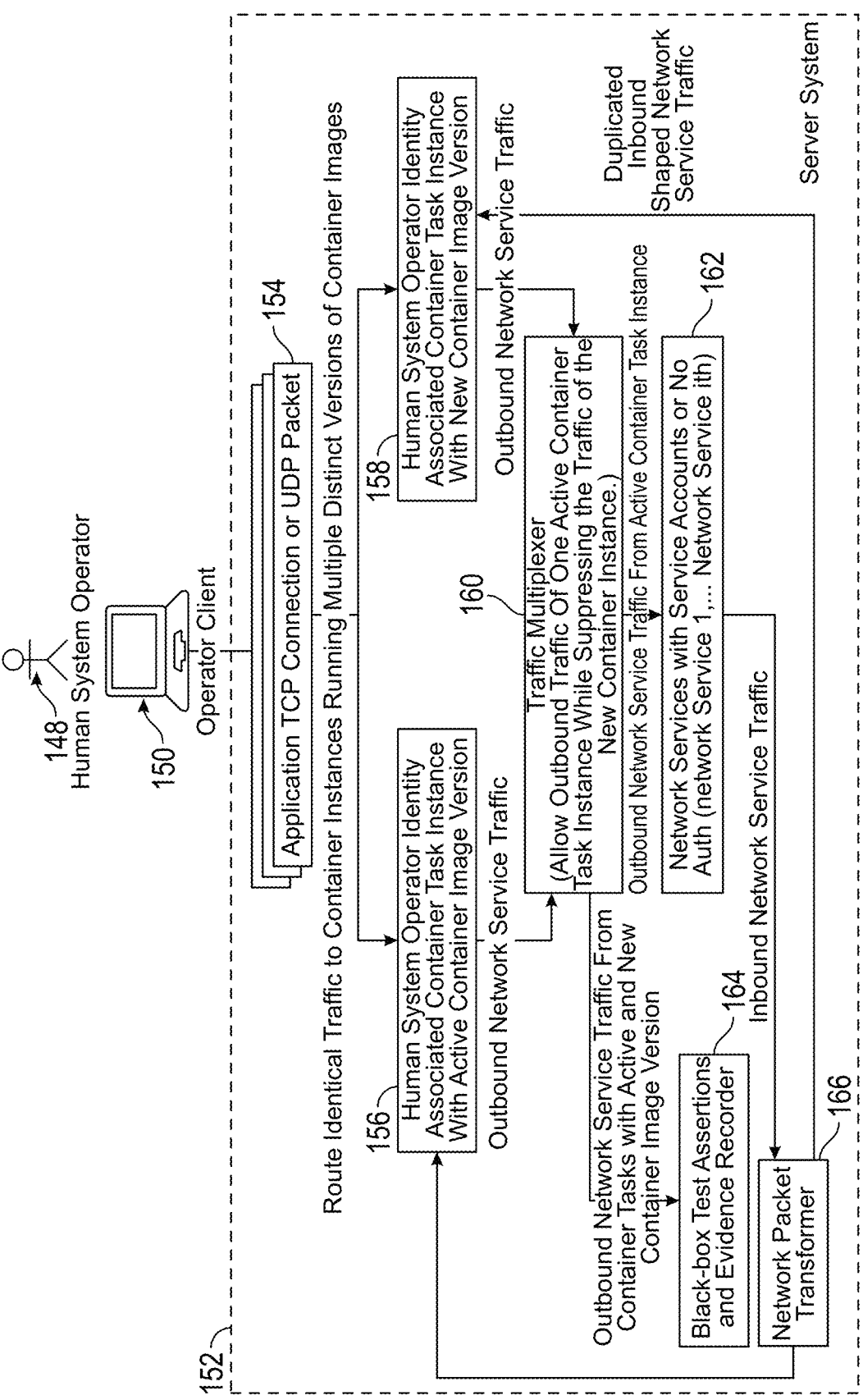
FIG. 8 illustrates an overview of a specific embodiment of a system of validating new containerized software versions via black-box testing.

Referring now to FIG. 8, another aspect of the present inventions is illustrated, in which a new container image version may be tested and validated. In a specific embodiment, this aspect of the present inventions may be referred to as an online black-box test assertions and evidence recording method to validate new containerized software versions. In this method, a specific embodiment of which is illustrated in FIG. 8, a human system operator 148 causes a command to be sent from an operator client 150 to a test system 152. The command is authenticated in the same manner as described above in connection with one of the various other embodiments of the present inventions, such as via application TCP connection or UDP packet 154. From there, the command is sent in parallel to a first (or active) container task instance 156 and a second (or new) container task instance 158. The first container task instance may be a human system operator identity associated container task instance with an active container image version. The second container task instance may be a human system operator identity associated container task instance with a new container image version. It is this second container task instance that is being tested, such as to determine if there is a mistake in the new container image version. The purpose is to find out if any such mistakes exist before the new container image version is put in to active use.

Still referring to FIG. 8, the outbound network service traffic exiting each of the first/active container task instance 156 and the second/new container task instance 158 is routed to a traffic multiplexer 160. The traffic multiplexer 160 will allow the outbound network service traffic from the first/active container task instance 156 to be transmitted to network services 162, but will not allow the outbound network service traffic from the second/new container task instance 158 to be transmitted to the network services 162. Separately, the traffic multiplexer 160 will send the outbound network service traffic from both the first/active container task instance 156 and the second/new container task instance 158 to a black box test assertions and evidence recorder 164. The function of the black box test assertions and evidence recorder 164 is to compare the two traffic streams to see if they are the same or different. If they are the same, then an indication may be provided that there are no mistakes in the new version. If they are different, then an indication may be provided that there is at least one mistake in the new version, and any such mistakes should be investigated and corrected, and the retested, before the new version is placed into service. In a specific embodiment, there may be pre-selected portions of the outbound network traffic that are to be compared. There are certain parts of the two traffic streams that would be known or expected to be different (e.g., date patterns), so those portions would not be part of the testing comparison.

Still referring to FIG. 8, and referring again to the network services 162, the outbound network service traffic from the first/active container task instance 156 is routed as inbound network service traffic from the network services 162 to a network packet transformer 166. The network packet transformer 166 may make a copy of the traffic stream and send a response to both the active container image version 156 and the new container image version 158. The response sent to the active container image version 156 is exactly what is coming from the network services 162. The response sent to the new container image version 158 is shaped to make it look like the outbound network service traffic from the new container image version 158 actually went through to the network services 162, even though it did not since it was blocked as explained above. The testing of the new container image version 158 will continue as long as the commands continue to come into the test system 152.

Figure 9:
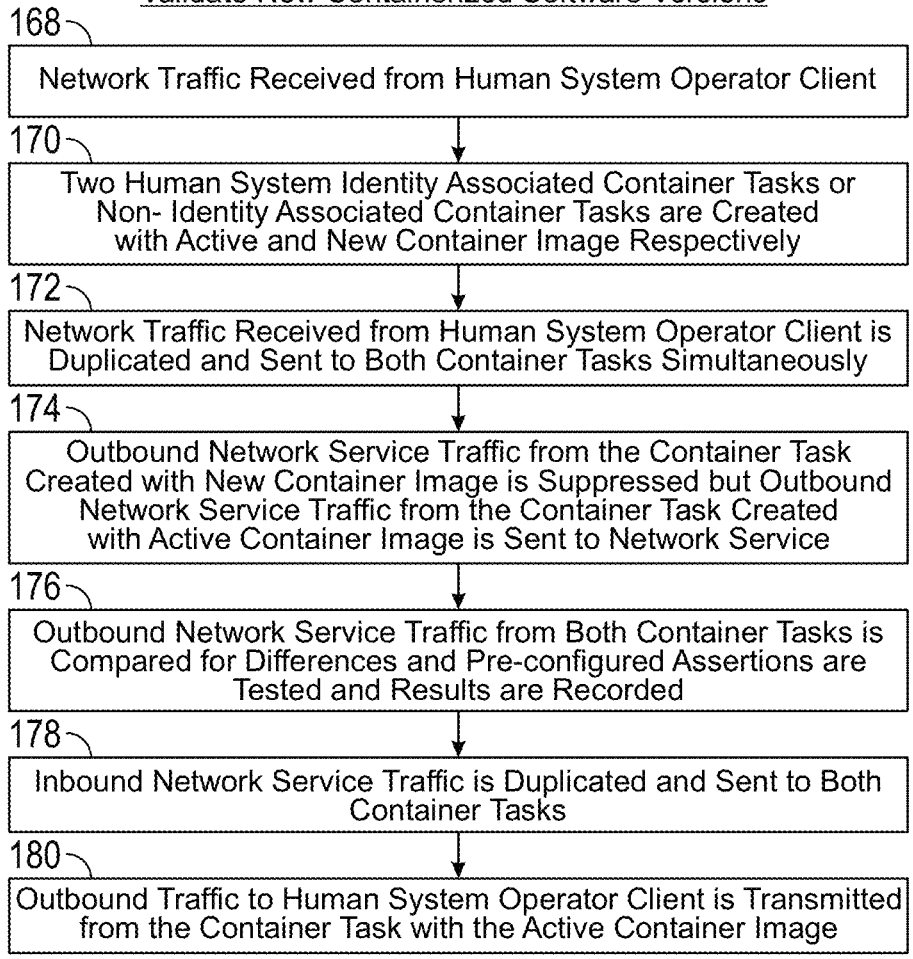
FIG. 9 illustrates a specific embodiment of a method that may be employed to validate new containerized software versions via black-box testing.

Referring now to FIG. 9, a specific embodiment of a method for online black-box test assertions and evidence recording to validate new containerized software versions is illustrated. At step 168, network traffic is received from the human system operator client. Next, at step 170, two human system identity associated container tasks or non-identity associated container tasks are created with active and new container images respectively. Next, at step 172, network traffic received from the human system operator client is duplicated and sent to both the active and new container tasks simultaneously. Next, at step 174, outbound network service traffic from the container task created with the new container image is suppressed or blocked from being sent to the network service, but the outbound network service traffic from the container task created with the active container image is allowed to be sent to the network service. Next, at step 176, the outbound service traffic from both the active and new container tasks is compared for differences and preconfigured assertions are tested and the results are recorded. Next, at step 178, inbound network service traffic is duplicated and sent to both the active and new container tasks. Next, at step 180, outbound traffic to the human system operator client is transmitted from the container task with the active container image.

Furthermore, the methods and systems described herein allow for the mitigation of risks which emerge from the use of service accounts in distributed systems by contextualizing operations performed by systems to the identity of the system's human operator who initiated the associated side-effect operations, making it possible to make use of access control lists (ACL) to prevent privilege escalation, as shown in step 128 from FIG. 4E, preventing an authenticated or unauthenticated human system operator from performing operations beyond the access scope of the given human system operator. These approaches also make it possible to reject any network transmissions if audit trail storage fails and prevent transmissions from proceeding, referring to step 130 in FIG. 4E, likewise when handling TCP connections sending client keep alive packets with ACK flag to allow client to wait for response while storage is performed and subsequently the transmission is resumed with final destination, guaranteeing transactional system auditability for legal and organizational compliance purposes, while decoupling the encrypted audit data from the datastores of the application to mitigate data breach risk of the audit trail data.

Containers can be used in combination with VMs (Docker, supra.) to allow for providing a tailored environment to establish the guarantees described by the methods and systems present in this disclosure. In addition, to supporting the methods and systems disclosed herein, container images do not need to be extracted for modification, to preserve the integrity of the publisher's software release, and all audit trail recording, transmission capturing, black-box testing and ACL bypass prevention may be performed outside of the containerized application's scope. Depending on the method of network interception chosen, the publisher may need to add a local certificate authority certificate authorizing the audit trail capture system to capture audit trails and enforce ACLs to prevent privilege escalation attempts. However, alternatively internal system communication could be made without in-transit encryption, or the container image could be extracted, and a CAA root certificate could be added to the image at the time of the deployment of the container image to enhance developer experience. Likewise, Domain Name System query record responses received by the human system operator identity associated container task may be appended with additional local CAA records alongside the records returned from authoritative Domain Name Systems to aid the method of network interception chosen for particular network domain names.

In a specific embodiment, the described systems of this disclosure may be deployed to a physical machine (bare metal) or virtual machine (VM) with a physical or virtual network interface, thereby allowing for containerized network applications to be deployed to itself.

The aforementioned embodiment may create a network ingress which listens on a network exposed physical or virtual network interface and may be the command or message entry point to the containerized application. This network ingress may accept TCP connections or UDP hole punched packets. See Wan traversal via UDP Hole-punching. (n.d.), the contents of which are fully incorporated herein by reference. In a specific embodiment, if UDP hole punched packets are exchanged the client and containerized network application are responsible for cryptographically signing and encrypting the UDP hole punched packet data for security, as shown in step 126 from FIG. 4E. See QUIC (Quic, a multiplexed transport over UDP. (n.d.), the contents of which are fully incorporated herein by reference. Other UDP based protocols may also be used encapsulated in the UDP hole punched packets described in this disclosure, whereas the hole punching is optional wherever mentioned in this disclosure.

In the case of handling TCP connections, in a specific embodiment, upon the reception of the first TCP SYN packet of a TCP duplex connection stream, the system may send back an TCP ACK packet on behalf of the containerized network application being encapsulated by the system. See TCP handshake-MDN web docs glossary; definitions of web-related terms: MDN. MDN Web Docs Glossary; Definitions of Web-related terms MDN. (n.d.), the contents of which are fully incorporated herein by reference. This initiates an authentication procedure to determine the identity of the human system operator 12 who initiated the operation to initiate the TCP connection and associates the inbound TCP connection and all subsequent network operations that will execute as a side-effect to the human system operator 12 initiated operation on the containerized network application to the identity of the human system operator 12.

On the contrary, in a specific embodiment, when handling a UDP hole punched data stream, upon the reception of the first UDP data packet from a human system operator client 14 within a configurable rising-edge debounced time interval, as shown in step 146 from FIG. 4F, an existing container task can be repurposed to prevent creating a new container task to handle each UDP packet for system performance purposes. Optionally, a subroutine or function can be provided to the system described to decrypt or encrypt UDP hole punched packet data by destination, in order to be able to associate them with a human system operator identity and prevent privilege escalation, while any other TCP connections made or UDP data streams emitted by the human system operator identity associated container task used to handle the originator inbound UDP data stream, are associated and routed optionally contingent upon successful storage by the audit recording subsystem.

Prior to proceeding with authentication, a check for existing authentication negotiated credential data in the TCP connection or UDP hole punched data stream from the client may be performed for various supported protocols. If existing protocol specific authentication credentials are found, the system may proceed to validate the authentication and decode the human system operator identity, whereas given that protocol specific authentication credentials are not found, invalid or expired, the authentication procedure is initiated, as shown in FIG. 4B. In a specific embodiment, any data transmitted from the client is buffered to be sent to a human system operator identity associated container task upon successful authentication or is discarded upon failure to authenticate.

Referring to steps 78 and 80 from FIG. 4B, the authentication procedure mentioned may involve human interactions via a client device, which can be performed asynchronously or synchronously.

In a specific emobidiment, if asynchronous authentication mode is chosen, as shown in step 78 from FIG. 4B, TCP keep alive packets with ACK flags are sent back through the client initiated system TCP connection periodically or alternatively UDP hole punch packets are buffered while authentication is established on an alternative network stream using an authentication method supporting a combination of protocols such as PUB-SUB messaging via WebSockets, HTTP/2, Webhooks, Kerberos, SAML, OAuth, LDAP, AD, and other HTTP(S) OR NON-HTTP(S) based authentication protocols. See Fette, I., Melnikov, A. (2011 Dec. 1). The Websocket Protocol. The WebSocket Protocol; Fette, I., & Melnikov, A. (2011 Dec. 1). RFC 7540-Hypertext Transfer Protocol version 2 (HTTP/2). Hypertext Transfer Protocol Version 2 (HTTP/2). Security assertion markup language (SAML) 2.0 profile for OAUTH 2.0 Client Authentication and Authorization Grants.; Hardt, D. (2012 Oct. 1). The OAuth 2.0 Authorization Framework. IETF.; Harrison, R. (2006 Jun. 1). RFC 4513-lightweight directory access protocol (LDAP): Authentication methods and security mechanisms. and Ricketts, J. (2020 May 8). Five steps for integrating all your apps with Azure ad-Microsoft Entra. Microsoft Entra | Microsoft Learn, the contents of all of the foregoing are fully incorporated herein by references.

However, if synchronous authentication mode is chosen instead, as shown in step 80 from FIG. 4B, the client-initiated system TCP connection may be used to perform an authentication handshake with the client. Only HTTP(S) based authentication protocols are supported for this purpose, where SAML, OAuth, or a custom HTTP(S) based human interaction driven authentication is performed through a protocol specific redirection pattern which results in the client injecting JWT, Cookie, or other bearer token to HTTP(S) request headers to authenticate subsequent TCP connections. See Jones, M., Bradley, J., & Sakimura, N. (2015 May 1). JSON web token (JWT). RFC Editor; Broyer, T. (2005 Jan. 5). Cookie-based HTTP Authentication Draft-Broyer-HTTP-cookie-AUTH-00. Cookie-based HTTP Authentication; and Jones, M., & Hardt, D. (2012 Oct. 1). The OAuth 2.0 authorization framework: Bearer token usage. RFC Editor, the contents of all of the foregoing are fully incorporated herein by reference. Synchronous authentication of this manner is not supported for UDP hole punched packets.

Authentications making use of password credentials, JWT, Cookie or other bearer token may be performed by sending authentication related HTTP(S) requests to non-identity associated containerized network application instances to ensure any authentication issued tokens can be used to perform decoding of the human system operator identity in subsequent or buffered TCP connections, UDP hole punched packet streams or encapsulated HTTP(S) requests to the system. Such non-identity associated containerized network application instances can only accept HTTP(S) requests to a preconfigured set of whitelisted endpoints for security. All other authenticated endpoints should not be made available via such non-identity associated container network application instances, and should only be served via a human system operator identity associated containerized network application instance. Non-identity associated containerized network application instances may also be used to serve content and data which is to be made publicly available.

In a specific embodiment, once a TCP connection or UDP hole punched packet stream has been authenticated, the human system operator identity associated with the client's TCP connection or UDP packet stream is decoded, by either utilizing the protocols related to the ones that were used to authenticate the TCP connection or UDP packet stream such as SAML, OAuth, LDAP or AD, or alternatively by submitting the JWT, Cookie or bearer token data to a non-identity associated containerized network application instance via a pre-negotiated standard endpoint, as shown in FIGS. 2A and 3A, which is not necessarily exposed via the network exposed physical or virtual network interface but exposed via the ephemeral virtual network interface attached to the non-identity associated containers' or container tasks' process ids or thread and connected to the bridge network interface, as shown in FIGS. 4D and 4F.

Each time a new version of the application container image is deployed a pool of non-identity associated containerized network application instances and container tasks are created upon deployment, which is scalable based on the amount of computational resources available, such that the pool can scale as computational resources are added to handle larger system loads as the number of simultaneous human system operators increases, while containers and container tasks running older versions of the application image are drained (are not sent new network traffic and are removed after they have processed active workloads) and removed from the existing pool. Non-identity associated containers and container tasks can be converted to human system operator identity associated containers and container tasks, as new non-identity associated containers and container tasks are created for handling new unique human system operator identities. Alternatively, the system can be operated with a fixed set of non-identity associated containers and container tasks being used to authenticate unauthenticated human system operators, while another set of human system operator identity associated containers are used to handle TCP connections and UDP data streams encapsulating commands and operations. An optimum ratio of non-identity associated, and identity associated containers and container tasks is to be chosen per implementation based on system load requirements and computational resource availability, or could scale dynamically by reacting to traffic patterns.

In a specific embodiment, in order to process an authenticated TCP connection or UDP hole punched packet stream, a new container task associated with a human system operator identity is created having a unique process id on the host operating system (booted on a virtual machine or bare metal). For each new container task created, a new ephemeral virtual network interface is created with a new network namespace scoped to the unique OS process id of the human system operator identity associated container task, which is then attached to a new ephemeral virtual network interface connected to a bridge network interface that is in turn connected to the network exposed physical or virtual network interface. See Shixiong, Q., Sameer, K. G., & Ramakrishnan, K. K. (2020 Oct. 11). Understanding Container Network Interface Plugins. NSF Public Access Repository, the contents of which are fully incorporated herein by reference. Given this mechanism, the container task is assigned a unique private IP address with network address translation to access external network resources. The new private IP address of the container task is used to associate it with one unique human system operator identity at a time, where the exposed network services of the containerized application are sent traffic scoped to the individual human system operator via the aforementioned private IP address. An existing container or container task could be repurposed for a different human system operator identity as long as the application provides standard status control HTTP endpoints to the system disclosed to describe whether background or multithreaded workloads are actively running and the human system operator identities on whose behalf the workloads are running on a given container or container task and the application also provides the system with control HTTP endpoints to allow the system to block any new workloads from running. Such control endpoints are only exposed to the system disclosed internally and not to the network exposed virtual or physical interface visible to the human system operator clients, allowing the system to drain running container tasks and their threads without sending any new workloads to them for repurposing or decommissioning for rolling upgrades.

In a specific embodiment, a method of creating a unique host operating system process with a process id exclusively reserved for a single containerized application task associated to a human system operator at a time, to process the network traffic of a single human system operator identity using a network namespace (Shixiong, supra.) and ephemeral network interface, may be substituted with the method of using special purpose operating systems and containerization environments which allow running a containerized application task in a unique operating system thread in place of a unique operating system process. In such a configuration, unique operating system threads are to be used to process the network traffic associated with human system operator using an ephemeral network interface with a network namespace (Shixiong, supra.) scoped to a unique operating system thread as opposed to be being scoped to a unique operating system process, contrary to the method described above.

In a specific embodiment, a key governing feature of the methods and systems described in this disclosure may be that identity associated container or container tasks are exclusively used to process the TCP connections and UDP data streams from one human system operator at a given time. In this specific embodiment, this fundamental system constraint makes it possible to reduce all connections and data streams made by the identity associated containers or container tasks to be associated with a human system operator which are to be possibly intercepted, stored, black-box tested and be prevented from transmission if they violate access control lists policies applicable to the given human system operator.

In a specific embodiment, the present inventions may include two methods for intercepting side-effect network operations of a human system operator identity associated container task.

In a specific embodiment, a primary interception method may comprise of capturing all ethernet frames in transit through an ephemeral virtual network interface, decrypting any encapsulated TCP connections and UDP hole punched data streams using a local certificate authority respected by the container image or providing a hook pattern for a pre-programmable subroutine to decrypt the traffic, optionally ensuring that the policies in enforced access control lists (ACLs) are not violated by the commands encapsulated via constraining of side-effect SQL queries or REST and SOAP requests etc., and optionally subsequently storing the decrypted data sent to and from a human system operator identity associated container task and auxiliary network services through the ephemeral virtual network interface against the human system operator identity, timestamp and a globally unique identifier (GUID) identifying the ephemeral virtual network interface used.

In a specific embodiment, a secondary interception method may consist of configuring internal proxy endpoints for intercepting side-effect network transactions to particular network services like SQL servers, REST or SOAP services, and using a container task firewall to block traffic to all other network services besides the ones with configured internal proxy endpoints. The configurable proxy endpoints listen on an internal IP address only visible to the ephemeral virtual network interfaces attached to the human system operator identity associated container tasks, where the source IP address of the traffic sent to the proxy endpoints is used to determine the originator human system operator identity to record to the audit trail recorder subsystem with a timestamp and a globally unique identifier (GUID) identifying the ephemeral virtual network interface used. In a specific embodiment, the proxy endpoints are responsible for decrypting traffic originating from the aforementioned container task and re-encrypting the traffic before transmitting it to the destination network service and similarly decrypting the response and re-encrypting it before sending it to the human system operator identity associated container task. However, since the interactions between container tasks and intercepting proxies occur on the internal network, these network transactions may be unencrypted to prevent adding another certificate authority to the container images, CAA records to DNS query responses, or having to provide decryption subroutines.

Multiple human system operator identity associated container tasks and ephemeral virtual network interfaces may be used to exclusively process subsequent simultaneously executing network commands from the same human system operator, requiring de-multiplexing of audited side-effect network transactions, yielding the ability to deduce the originating network command of a side-effect network transaction.

Furthermore, it is possible to perform online black-box testing and comparing of various versions of container images by deterministically replaying captured commands on network isolated container tasks and asserting complete or partial occurrence of previously observed or live side-effect network traffic, as shown in FIG. 8. Therefore, simultaneously existing human system operator identity associated container tasks may be created from distinct container image versions, and the human system operator sent network commands or traffic may be sent redundantly to such multiple simultaneously existing container tasks housing different software container image versions concurrently using a Traffic Multiplexer to identify software programming errors and bugs by determining differences in complete or partial side-effect network traffic, where outbound traffic from all container tasks associated to the human system operator but one is suppressed, and the same inbound traffic from the unsuppressed container tasks is transmitted to all container tasks. The techniques described above and in connection with FIG. 8 are similar to traditional boundary-scan (Tesability primer, supra.) methods for testing of ICs.

Additionally, different container images may be configured for use by specific human system operators, to allow for targeted launching of software versions and features.

The stored data with the preceding methods can be used to establish an audit trail for legal or organizational compliance purposes, prevent privilege escalation by improving ACL policies during testing as they are enforced prior to proceeding with transmission before storage, perform retrospective studies on policy violations attempts, or perform offline black-box testing of user stories (Cohn, supra.) and access patterns of the system across container images to find out whether a change in software version causes unexpected changes in past known system behavior, as opposed to the online black-box testing method described above. See Cohn, M. (n.d.). User stories and user story examples by Mike Cohn. Mountain Goat Software. Retrieved Dec. 1, 2022, the content of which are fully incorporated herein by reference.

All persistently stored data may be encrypted using a symmetric encryption algorithm such as Advanced Encryption Standard (AES) with a decryption key held by auditors responsible for auditing the actions of groups of human system operators. See Dworkin, M. J., Barker, E. B., Nechvatal, J. R., Foti, J., Bassham, L. E., Roback, E., & Jr., J. F. D. (2021 Mar. 1); and Advanced encryption standard (AES). NIST, the contents of the foregoing are fully incorporated herein by reference. Alternatively, human system operators can hold their own individual encryption keys or assign a custodian to hold their encryption keys to encrypt their audit trail data which are provided when making TCP connections or sending UDP packet streams. In an alternative method of key distribution, legal remedies could be sought to perform an audit under the penalty of perjury employing the instrument of subpoena, if the key holder is legally obligated to comply with an audit of the human system operator whose actions are to be audited. Encryption key assignments and custodianship may be handled during organizational Identity Assurance Level (IAL), Authenticator Assurance Level (AAL), and (Federation Assurance Level (FAL) procedures working in tandem with the methods and systems defined in this disclosure. See Grassi, P. A., Garcia, M. E., & Fenton, J. L. (2017 Jun. 1). NIST Special Publication 800-63. NIST Pages, the contents of which are fully incorporated herein by reference.

A unique cryptographic nonce, a commonly known external system identifier identifiable to the human system operator identity, or the human system operator identity information itself alongside contextualization rules and human readable auditable events may also be attached to network traffic sent to and from network services through a mutually understandable network protocol to allow containerized network applications and network services to identify traffic and control or react to it in accordance with their own control logic and access policies which may be employed without the methods of decryption or proxying of network traffic described in this disclosure. A prescribed mutually understandable network protocol is to encapsulate the TCP or UDP packet data to network services with Start of Text (STX) and End of Text (ETX) ASCII control code data or similar sentinel sequences, commonly referred to as stuffing (Savage, supra.), either bit-level stuffing (id.) or byte stuffing (id.), and accompany transmitted packet data with, supplementary stuffing partitioned encapsulated data with a cryptographic nonce, an optionally commonly known external system identifier identifiable to the human system operator identity, or the human system operator identity information itself, and appropriate de-encapsulation is performed by receiving network service, middleware or application to isolate transmitted data and process it in accordance to the human system operator identity associated with the traffic received. A network service, middleware or application can receive or transmit back configuration or access contextualization rules from or to the system described in this disclosure, respectively, using the described appended stuffing based encapsulation and partitioning paradigms. The stuffing partitioned encapsulated data in network packets may contain application communication, configuration data, access contextualization rules such as ACL constraints and permissions, firewall rules, query constraints or another data filtering criteria, such as shown in step 128 from FIG. 4E. Furthermore the network service, middleware or application being communicated with may communicate back critical human readable actions performed to be recorded in an audit trail or record and store an audit trail of its own against the identity of the human system operator issuing network activity initiating commands over the network. A network service, middleware or application may transmit to a system described herein or other network services to inquire or send stuffing partitioned encapsulated data in network packet data with further information about the human system operator identity associated such as the unique cryptographic nonce or the optionally commonly known external system identifier appended to the encapsulated original TCP or UDP packet data. Network services, middleware or application may be implemented using the methods described herein, where an ephemeral human system operator identity associated container is used to process the network traffic associated to each respective human system operator identity, such as shown in FIG. 7. Original TLS encryption or other forms of data encryption may be preserved with bit-level stuffing or byte level stuffing encapsulation and any network packet data appended encapsulated data may have distinct encryption to the original packet data encapsulated. In a specific embodiment, the receiving network service, application or middleware may be responsible for partitioning bit-level stuffing or byte stuffing encapsulated data and handling it accordingly and storing or communicating back auditable human system operator command side-effects in a time linearized and lingually comprehensible manner.

Lastly, upon the termination of an authenticated TCP connection or UDP hole punched data stream, the system operator identity associated with the container task and container can be released alongside the ephemeral virtual network interface attached. However, based on the amount of computational resources available, the container task, container and ephemeral virtual network interface can be held for re-use for the same or different human system operator identity for subsequent TCP connections or UDP hole punched data stream by optionally debouncing the removal of resources to the falling edge of a dynamically configurable time interval. As longer lasting containers and container tasks provide better support for application code leveraging multi-threading, such as leveraged in step 146 from FIG. 4F. See Christoffersen, J. (2015, Sep. 3). Switch Bounce and how to deal with it-technical articles. All About Circuits, the contetns of which are fully incorporated herein by reference.

Computer Architecture

The present inventions can be realized in hardware, software, or a combination of hardware and software. In a specific embodiment, a system according to the present inventions can be realized in a centralized fashion in one computer system, or in a distributed fashion where different elements are spread across several interconnected computer systems. Any kind of computer system or other apparatus adapted for carrying out the methods and inventions described herein may be used for purposes of the present inventions. A typical combination of hardware and software could be a general-purpose computer system with a computer program that, when being loaded and executed, controls the computer system such that it carries out the methods and inventions described herein.

The figures herein include block diagram and flowchart illustrations of methods, apparatus(s) and computer program products according to various embodiments of the present inventions. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus may be used to implement the functions specified in the block, blocks or flow charts. These computer program instructions may also be stored in a computer-readable medium or memory that can direct a computer or other programmable data processing apparatus to function in a particular manner, such that the instructions stored in the computer-readable medium or memory produce an article of manufacture including instructions which may implement the function specified in the block, blocks or flow charts. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block, blocks or flow charts.

Those skilled in the art should readily appreciate that programs defining the functions of the present inventions can be delivered to a computer in many forms, including but not limited to: (a) information permanently stored on non-writable storage media (e.g., read only memory devices within a computer such as ROM or CD-ROM disks readable by a computer I/O attachment); (b) information alterably stored on writable storage media (e.g., floppy disks and hard drives); or (c) information conveyed to a computer through communication media for example using wireless, baseband signaling or broadband signaling techniques, including carrier wave signaling techniques, such as over computer or telephone networks via a modem, or via any of the networks included within the systems discussed above.

Referring now to FIG. 10, a diagram is shown illustrating an example of a computer 304 that may be used in connection with the present inventions. The computer 304 may include at least one processor 306 and at least one memory 308, each of which may be coupled to a local interface or bus 310.

An operating system 312 may be stored in the memory 308 and executable by the processor 306. Any variety of software programs 314 may also be stored in the memory 308 and executable by the processor 306. In a specific embodiment, examples of programs that may be stored in the memory 308 and executable by the processor 306 may include one or more programs that may implement the functionality described hereinabove in connection with FIGS. 1-9. A media player application 316 may be stored in the memory 308 and executable by the processor 306. Also stored in the memory 306 may be various forms of data.

The term "executable" as used herein means that a program file is of the type that may be run by the processor 306. In specific embodiments, examples of executable programs may include without limitation: a compiled program that can be translated into machine code in a format that can be loaded into a random access portion of the memory 308 and run by the processor 306; source code that may be expressed in proper format such as object code that is capable of being loaded into a random access portion of the memory 308 and executed by the processor 306; or source code that may be interpreted by another executable program to generate instructions in a random access portion of the memory 308 to be executed by the processor 306. An executable program may be stored in any portion or component of the memory 308 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 308 may include both volatile and nonvolatile memory and data storage components. Volatile components are those that do not retain data values upon loss of power. Nonvolatile components are those that retain data upon a loss of power. Thus, the memory 308 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In a specific embodiment, the processor 306 may represent multiple processors 306 and/or multiple processor cores and the memory 308 may represent multiple memories 306 that operate in parallel processing circuits, respectively. In such a case, the local interface 310 may be an appropriate network that facilitates communication between any two of the multiple processors 306, between any processor 306 and any of the memories 308, or between any two of the memories 308, etc. The local interface 310 may comprise additional systems designed to coordinate this communication, including, for example, performing load balancing. The processor 306 may be of electrical or of some other available construction.

Although the programs and other various systems, components and functionalities described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components. Such technologies are generally well known by those skilled in the art and, consequently, are not described in detail herein.

The flowcharts within FIGS. 1-9 show the functionality and operation of various specific embodiments of certain aspects of the present inventions. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 306 in a computer system or other system. The machine code may be converted from the source code, etc. If embodied in hardware, each block may represent a circuit or a number of interconnected circuits to implement the specified logical function(s).

Although the flowcharts within FIGS. 1-9 may show a specific order of execution, it is understood that the order of execution may differ from that which is depicted. For example, the order of execution of two or more blocks may be scrambled relative to the order shown. Also, two or more blocks shown in succession in the flow charts within FIGS. 1-9 may be executed concurrently or with partial concurrence. Further, in some embodiments, one or more of the blocks shown in FIGS. 1-9 may be skipped or omitted. In addition, any number of counters, state variables, warning semaphores, or messages might be added to the logical flow described herein, for purposes of enhanced utility, accounting, performance measurement, or providing troubleshooting aids. It is understood that all such variations are within the scope of the present inventions.

Any logic or application described herein that comprises software or code can be embodied in any non-transitory computer-readable medium, such as computer-readable medium 318 shown in FIG. 10, for use by or in connection with an instruction execution system such as, for example, a processor 306 in a computer system or other system. In this sense, the logic may comprise, for example, statements including instructions and declarations that can be fetched from the computer-readable medium 318 and executed by the instruction execution system. In the context of the present inventions, a "computer-readable medium" may include any medium that may contain, store, or maintain the logic or application described herein for use by or in connection with the instruction execution system.

The computer-readable medium 318 may comprise any one of many physical media such as, for example, magnetic, optical, or semiconductor media. More specific examples of a suitable computer-readable medium 318 would include, but are not limited to, magnetic tapes, magnetic floppy diskettes, magnetic hard drives, memory cards, solid-state drives, USB flash drives, or optical discs. Also, the computer-readable medium 318 may be a random access memory (RAM) including, for example, static random access memory (SRAM) and dynamic random access memory (DRAM), or magnetic random access memory (MRAM). In addition, the computer-readable medium 318 may be a read-only memory (ROM), a programmable read-only memory (PROM), an erasable programmable read-only memory (EPROM), an electrically erasable programmable read-only memory (EEPROM), or other type of memory device.

The computer 304 may further include a network interface 320 coupled to the bus 310 and in communication with a communication network 16. The network interface 320 may be configured to allow data to be exchanged between computer 304 and other devices attached to the communication network 16 or any other network or between nodes of any computer system or a system. The communication network 16 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, the network interface 320 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

The computer 304 may also include an input/output interface 322 coupled to the bus 310 and also coupled to one or more input/output devices, such as a display 324, a touchscreen 326, a mouse or other cursor control device (e.g., television remote control) 328, and/or a keyboard 330. In certain specific embodiments, further examples of input/output devices may include one or more display terminals, keypads, touchpads, scanning devices, voice or optical recognition devices, or any other devices suitable for entering or accessing data by one or more computers 304. Multiple input/output devices may be present with respect to a computer 304 or may be distributed on various nodes of computer system, a system and/or any of the devices discussed above. In some embodiments, similar input/output devices may be separate from the computer 304 and may interact with the computer 304 or one or more nodes of computer system through a wired or wireless connection, such as through the network interface 320.

It is to be understood that the inventions disclosed herein are not limited to the exact details of construction, operation, exact materials or embodiments shown and described.

Although specific embodiments of the inventions have been described, various modifications, alterations, alternative constructions, and equivalents are also encompassed within the scope of the inventions. Although the present inventions may have been described using a particular series of steps, it should be apparent to those skilled in the art that the scope of the present inventions is not limited to the described series of steps. The specification and drawings are, accordingly, to be regarded in an illustrative rather than a restrictive sense. It will be evident that additions, subtractions, deletions, and other modifications and changes may be made thereunto without departing from the broader spirit and scope of the inventions as set forth in the claims set forth below. Accordingly, the inventions are therefore to be limited only by the scope of the appended claims. None of the claim language should be interpreted pursuant to 35 U.S.C. 112(f) unless the word "means" is recited in any of the claim language, and then only with respect to any recited "means" limitation.

The invention claimed is:

1. A human system operator identity audit trail system for improving security in the use of computer networks, the system comprising:
a server in communication with a processor coupled to memory, the memory including program instructions that when executed cause the processor to:
receive an incoming network request from a human system operator user device, wherein fulfilling the incoming network request requires communication of network traffic between the server and at least one network service in order for the network request to be satisfied;
determine the authenticated identity of a human system operator corresponding to the network request by authenticating the network request through a network authorization protocol leveraging an external system based on one of SAML, OAUTH, LDAP, Cookie and JWT, wherein the human system operator is an authenticated user's unique identifier;
associate the identity of the authenticated identified human system operator with the incoming network request;
create an application container executing a server software application within an operating system dedicated for executing the server software application, wherein the application container is a server process with a dedicated network via network address translation, and wherein the server software application uses a service account to authenticate with the at least one network service, and the authenticated human system operator identity is associated with each use of the service account with the at least one network service;
assign the application container to the incoming authenticated network request for processing exclusively, wherein to assign the application container to the incoming network request, the server is configured to:
create a human system operator identity associated container task with a unique process ID on a host operating system on the server,
create an ephemeral virtual network interface controller,
attach the ephemeral virtual network interface controller to a virtual network bridge interface controller that is connected to a network interface controller in the server and associated with the host operating system, the network interface controller being connected to a network, attach the ephemeral virtual network interface controller to the unique host operating system process ID of the human system operator identity associated container task, send incoming network traffic corresponding to the incoming network request to the human system operator identity associated container task, and detect attempted network transmission attempts to or from the human system operator identity associated container task, wherein the attempted network transmission is detected through the ephemeral virtual network interface controller; and capture and store all timestamped network traffic to network services from the application container exclusively associated to the authenticated human system operator identity such that concurrent user related traffic from the server to the network is stored mutually exclusively.

2. The system of claim 1, wherein the server is configured to use a unique IP address corresponding to the unique process ID to attach the ephemeral virtual network interface controller to the virtual network bridge interface controller.

3. The system of claim 1, wherein the server is configured to:

capture ethernet frames to and from the ephemeral virtual network interface controller attached to the unique process ID of the human system operator identity associated container task after the ephemeral virtual network interface controller is attached to the unique host operating system process ID of the human system operator identity associated container task and before incoming network traffic corresponding to the incoming network request is sent to the human system operator identity associated container task.

4. The system of claim 1, wherein the server is configured to detect attempted network transmission attempts to or from the human system operator identity associated container task, wherein the attempted network transmission is detected through configured proxy endpoints.

5. The system of claim 1, wherein the server software application determines the destination network service in reaction to execution of the incoming network request from the human system operator user device.

6. The system of claim 1, wherein the server software application includes an interception mode in which original destination network service network addresses are used to communicate with the at least one network service, and a proxy mode in which proxy endpoints are used to communicate with the at least one network service.

7. A non-transitory computer readable medium for storing instructions that when executed by a computer processor in communication with a server causes the computer processor to perform steps for improving security in computer networks, the steps comprising:

receiving an incoming network request from a human system operator user device, wherein fulfilling the incoming network request requires communication of network traffic between the computer processor coupled to memory and at least one network service in order for the network request to be satisfied;

determining the authenticated identity of a human system operator corresponding to the network request by authenticating the network request through a network authorization protocol leveraging an external system based on one of SAML, OAUTH, LDAP, Cookie and JWT, wherein the human system operator is an authenticated user's unique identifier;

associating the identity of the authenticated identified human system operator with the incoming network request;

creating an application container executing a server software application within an operating system dedicated for executing the server software application, wherein the application container is a server process with a dedicated network via network address translation, and wherein the server software application uses a service account to authenticate with the at least one network service, and the authenticated human system operator identity is associated with each use of the service account with the at least one network service;

assigning the application container to the incoming authenticated network request for processing exclusively, wherein to assign the application container to the incoming network request, the computer processor is configured to:

create a human system operator identity associated container task with a unique process ID on a host operating system on the server create an ephemeral virtual network interface controller, attach the ephemeral virtual network interface controller to a virtual network bridge interface controller that is connected to a network interface controller in the server and associated with the host operating system, the network interface controller being connected to a network, attach the ephemeral virtual network interface controller to the unique host operating system process ID of the human system operator identity associated container task, send incoming network traffic corresponding to the incoming network request to the human system operator identity associated container task, and detect attempted network transmission attempts to or from the human system operator identity associated container task, wherein the attempted network transmission is detected through the ephemeral virtual network interface controller; and capturing and storing all timestamped network traffic to network services from the application container exclusively associated to the authenticated human system operator identity such that concurrent user related traffic from the server to the network is stored mutually exclusively.

8. The non-transitory computer readable medium of claim 7, wherein the steps further comprise using a unique IP address corresponding to the unique process ID to attach the ephemeral virtual network interface controller to the virtual network bridge interface controller.

9. The non-transitory computer readable medium of claim 8, wherein the steps further comprise:

capturing ethernet frames to and from the ephemeral virtual network interface controller attached to the unique process ID of the human system operator identity associated container task after the ephemeral virtual network interface controller is attached to the unique host operating system process ID of the human system operator identity associated container task and before incoming network traffic corresponding to the incoming network request is sent to the human system operator identity associated container task.

10. The non-transitory computer readable medium of claim 8, wherein the steps further comprise detecting attempted network transmission attempts to or from the human system operator identity associated container task through configured proxy endpoints.

11. The non-transitory computer readable medium of claim 7, wherein the server software application determines the destination network service in reaction to execution of the incoming network request command from the human system operator user device.

12. The non-transitory computer readable medium of claim 7, wherein the server software application includes an interception mode in which original destination network service network addresses are used to communicate with the at least one network service, and a proxy mode in which proxy endpoints are used to communicate with the at least one network service.

* * * * *